(12) United States Patent
Takahashi et al.

(10) Patent No.: US 8,223,349 B2
(45) Date of Patent: Jul. 17, 2012

(54) IMAGE-PROCESSING APPARATUS WITH ONLINE SUPPORT FUNCTION

(75) Inventors: Kazusei Takahashi, Nishinomiya (JP); Hisashi Uchida, Kuze-gun (JP); Yoshiyuki Tamai, Toyokawa (JP); Masaya Hashimoto, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/119,314

(22) PCT Filed: Sep. 2, 2009

(86) PCT No.: PCT/JP2009/065338
§ 371 (c)(1),
(2), (4) Date: Mar. 16, 2011

(87) PCT Pub. No.: WO2010/032617
PCT Pub. Date: Mar. 25, 2010

(65) Prior Publication Data
US 2011/0170138 A1 Jul. 14, 2011

(30) Foreign Application Priority Data
Sep. 18, 2008 (JP) ................. 2008-239497

(51) Int. Cl.
*G06F 3/12* (2006.01)
(52) U.S. Cl. ............ 358/1.1; 358/1.15; 700/15; 700/17; 700/26; 700/83; 715/762; 715/763; 715/764; 717/171; 710/15
(58) Field of Classification Search .................. 358/1.15; 700/15, 17, 26, 83; 715/762, 763, 764; 709/224, 709/225; 717/171; 710/15
See application file for complete search history.

(56) References Cited

U.S. PATENT DOCUMENTS
6,915,342 B1  7/2005 Motoyama
(Continued)

FOREIGN PATENT DOCUMENTS
JP   9-163060 A   6/1997
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Apr. 28, 2011, in the corresponding International Application No. PCT/JP2009/065338.

(Continued)

*Primary Examiner* — Jacky X Zheng
(74) *Attorney, Agent, or Firm* — Buchanan Ingersoll & Rooney PC

(57) ABSTRACT

An image processing apparatus that can provide an online support service is provided. The image processing apparatus includes a user operation data retaining section for retaining user operation data in which contents of user's operation performed by a user is recorded, an input section having a help key for instructing start of execution of an online support function, and a support data retaining section for retaining information about a support connecting destination to be connected in the online support. When recognizing pressing of the help key, the image processing apparatus refers to the user operation data so as to gain at least a part of the contents of the operation performed until a time point of the pressing, selects the support connecting destination according to the gained user operation contents with reference to the support data retaining section so as to request connection of communication with the selected support connecting destination.

15 Claims, 17 Drawing Sheets

U.S. PATENT DOCUMENTS

| | | | |
|---|---|---|---|
| 2001/0042117 A1 | 11/2001 | Yoshino et al. | |
| 2002/0093525 A1* | 7/2002 | Asauchi | 345/714 |
| 2003/0110412 A1* | 6/2003 | Neville | 714/25 |
| 2004/0012808 A1* | 1/2004 | Payne et al. | 358/1.15 |
| 2004/0090451 A1* | 5/2004 | Lay et al. | 345/713 |
| 2004/0162890 A1* | 8/2004 | Ohta | 709/218 |
| 2004/0201867 A1* | 10/2004 | Katano | 358/1.15 |
| 2006/0120616 A1 | 6/2006 | Kita | |
| 2006/0150031 A1 | 7/2006 | Asauchi | |
| 2006/0293765 A1 | 12/2006 | Tanaka et al. | |
| 2007/0011296 A1* | 1/2007 | Yoshino et al. | 709/223 |
| 2007/0200856 A1* | 8/2007 | Tashiro | 345/501 |

FOREIGN PATENT DOCUMENTS

| | | |
|---|---|---|
| JP | 2001-309454 | 11/2001 |
| JP | 2001-344203 A | 12/2001 |
| JP | 2002-108591 A | 4/2002 |
| JP | 2002-142059 A | 5/2002 |
| JP | 2003-163777 A | 6/2003 |
| JP | 2004-032511 A | 1/2004 |
| JP | 2004-201181 A | 7/2004 |
| JP | 2004-309454 A | 11/2004 |
| JP | 2004-355128 A | 12/2004 |
| JP | 2005-088322 A | 4/2005 |
| JP | 2005-196770 A | 7/2005 |
| JP | 2006-140898 A | 6/2006 |
| JP | 2007-001237 A | 1/2007 |
| JP | 2007-206999 A | 8/2007 |

OTHER PUBLICATIONS

International Search Report (PCT/ISA/210) for PCT/JP2009/065338 dated Dec. 15, 2009.

Written Opinion (PCT/ISA/237) for PCT/JP2009/065338 dated Dec. 15, 2009.

Office Action (Notification of Reason(s) for Refusal) dated Dec. 8, 2009, issued in the corresponding Japanese Patent Application No. 2008-239467, and an English Translation thereof.

* cited by examiner

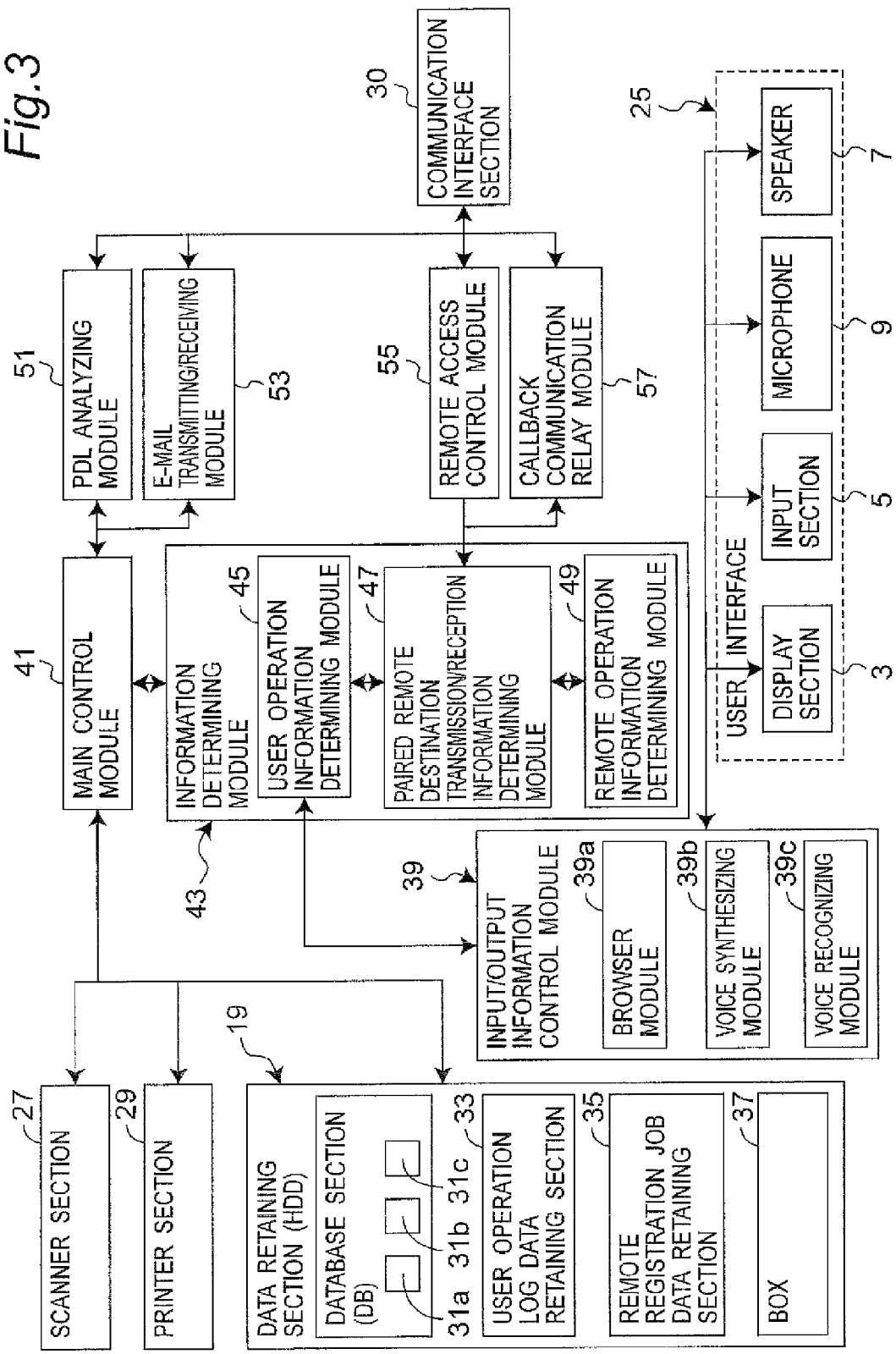

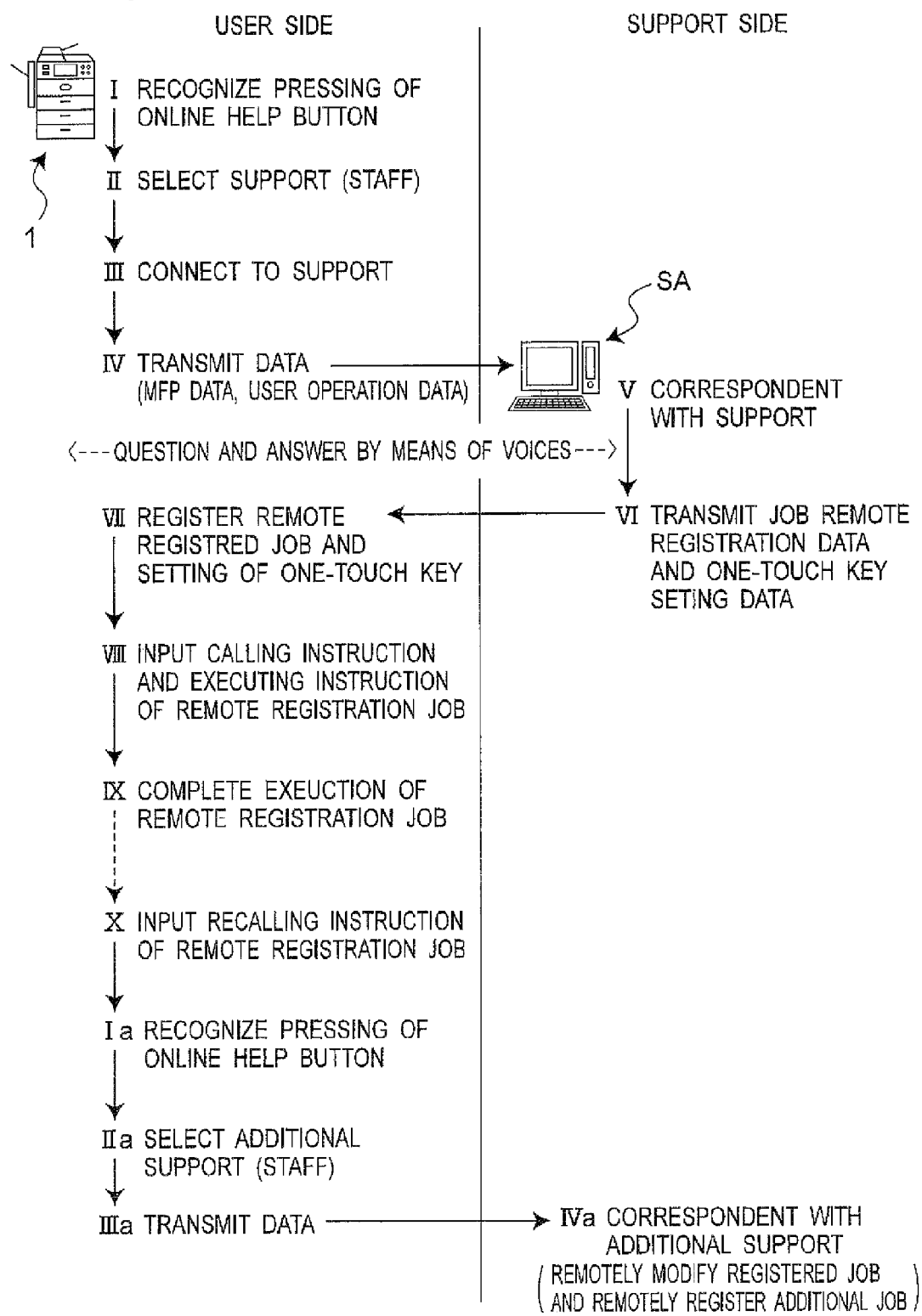

Fig.7

| CORRESPONDENT LANGUAGE | CORRESPONDENT TIME ZONE | SUBJECT TO BE SUPPORTED | FIRST CANDIDATE OF SUPPORT CONNECTING DESTINATION | SECOND CANDIDATE OF SUPPORT CONNECTING DESTINATION | THIRD CANDIDATE OF SUPPORT CONNECTING DESTINATION |
|---|---|---|---|---|---|
| JAPANESE | JAPAN/DAYTIME | PRINTING/COPYING FUNCTION | SUPPORT A | SUPPORT B | SUPPORT C |
| JAPANESE | JAPAN/DAYTIME | SCANNING FUNCTION | SUPPORT D | SUPPORT E | SUPPORT F |
| JAPANESE | JAPAN/DAYTIME | COMMUNICATION-RELATED | SUPPORT G | SUPPORT H | SUPPORT I |
| JAPANESE | JAPAN/DAYTIME | NEW TYPE/NEW FUNCTION | SUPPORT J | SUPPORT K | SUPPORT L |
| JAPANESE | JAPAN/LATE-NIGHT ZONE | ALL FUNCTIONS | SUPPORT M | SUPPORT N | SUPPORT O |
| ENGLISH/CHINESE | JAPAN/ALL TIME ZONE | ALL FUNCTIONS | SUPPORT P | SUPPORT Q | SUPPORT R |
| ENGLISH | U.S./DAYTIME | ALL FUNCTIONS | SUPPORT S | SUPPORT T | SUPPORT U |
| ENGLISH | EUROPE/DAYTIME | ALL FUNCTIONS | SUPPORT V | SUPPORT W | SUPPORT X |
| ENGLISH | EUROPE AND U.S./LATE-NIGHT ZONE | ALL FUNCTIONS | SUPPORT Y | SUPPORT Z | SUPPORT AA |
| CHINESE | CHINA/DAYTIME | ALL FUNCTIONS | SUPPORT AB | SUPPORT AC | SUPPORT AD |
| CHINESE | CHINA/LATE-NIGHT ZONE | ALL FUNCTIONS | SUPPORT AE | SUPPORT AF | SUPPORT AG |
| C1 | C2 | C3 | C4 | C5 | C6 |

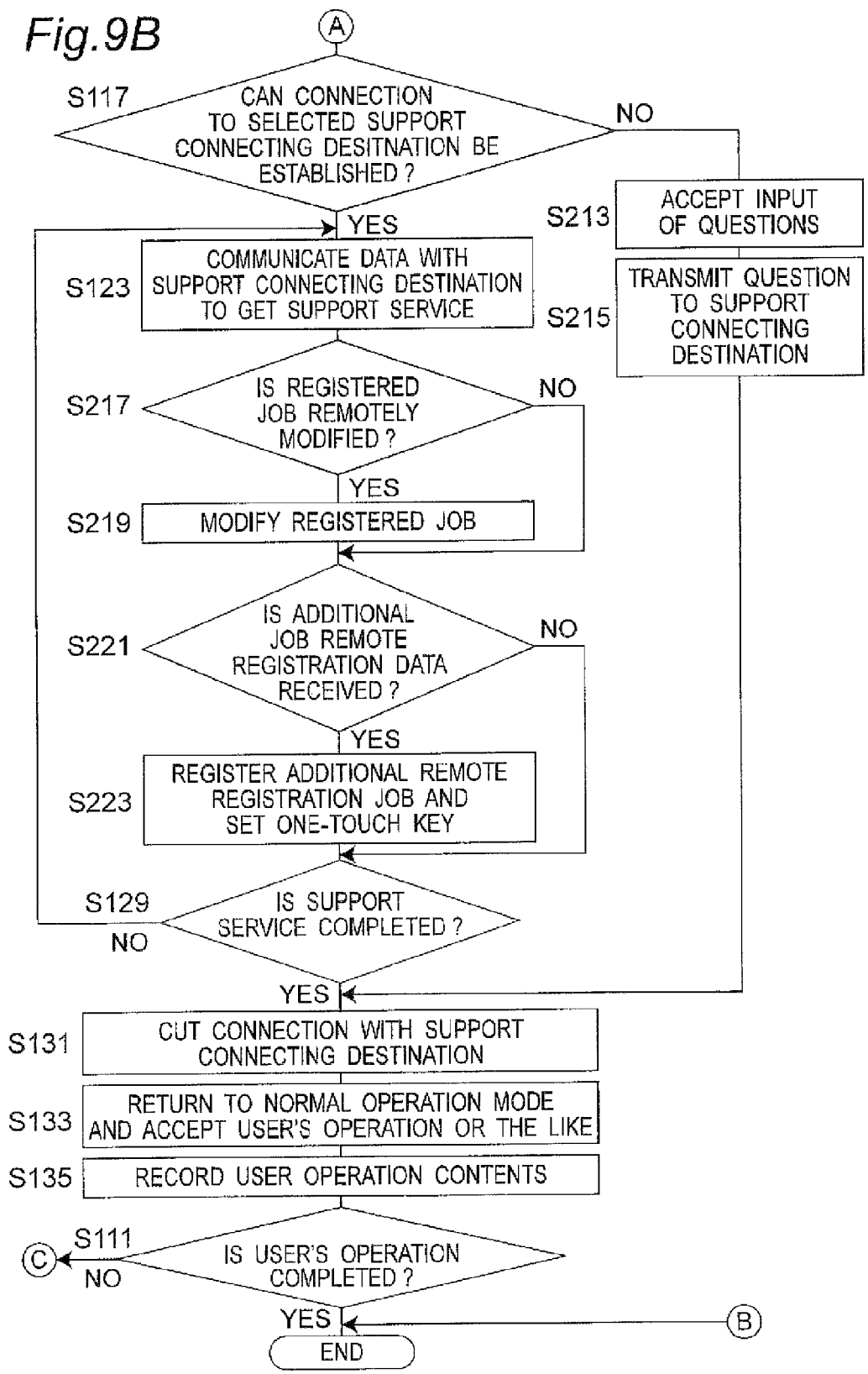

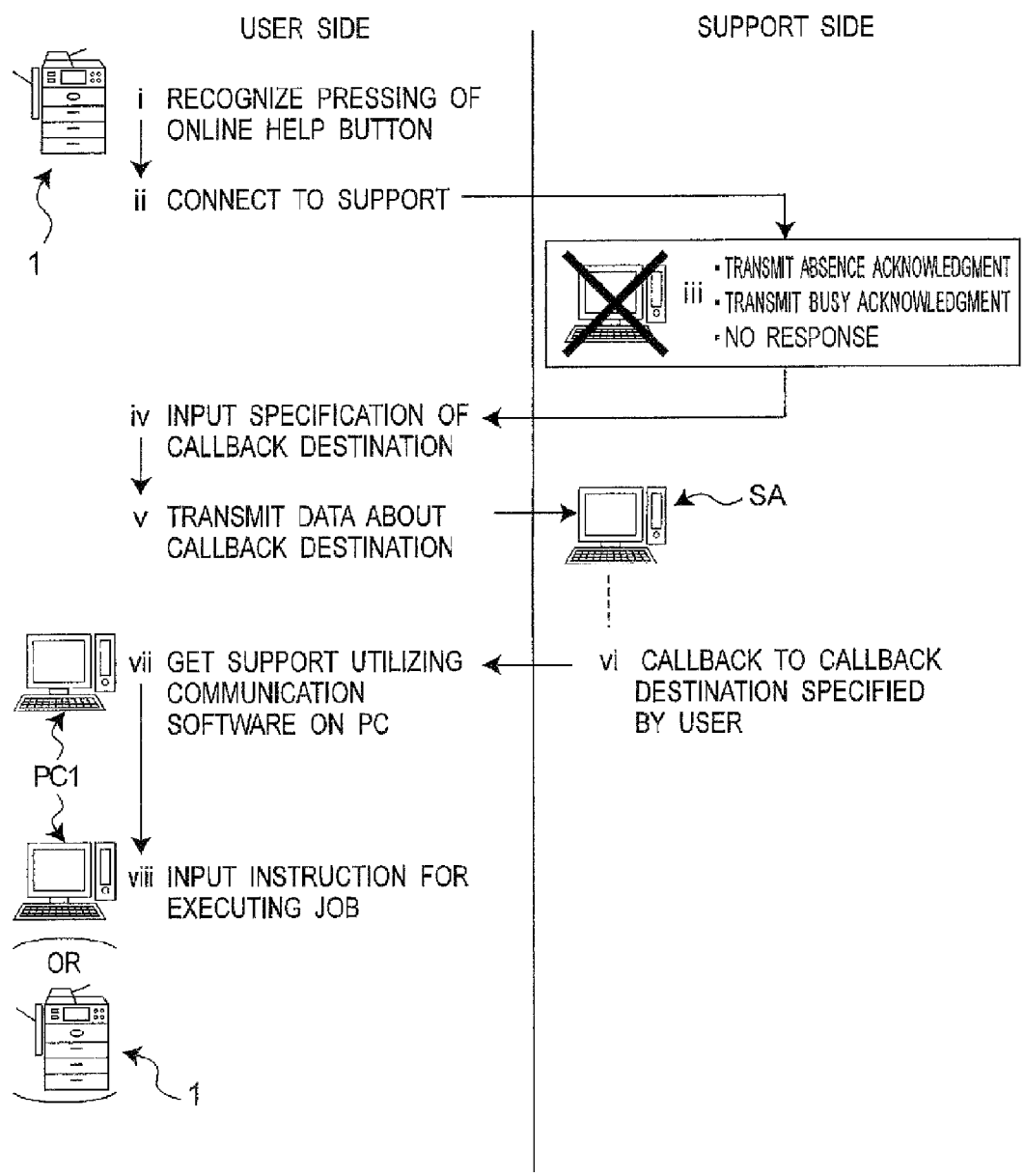

Fig.14

◎ SET CALLBACK DESTINATION :
  SELECT REGISTERED DATA OR INPUT INFORMATION ABOUT NEW CALLBACK DESTINATION

☐ USING MFP      MFP-ID      : △☐×
                 user name : ☆○■

■ REGISTERED PC           IP ADDRESS     : 192.*.*.***  ⎫
☐ REGISTERED CELLULAR PHONE  Phone Number : 090-**-**    ⎬ 65
☐ REGISTERED TELEPHONE    Phone Number : 03-**-**       ⎭

☐ UNREGISTERED PC         IP ADDRESS      (              )
☐ UNREGISTERED TELEPHONE  Phone Number  (              )

Fig.15

◎ QUESTIONS :
  SELECT IF YOUR QUESTION IS ANY ONE OF THE FOLLOWING QUESTIONS.
  IF NOT, SPEAK QUESTION THROUGH MICROPHONE.

YOUR QUESTION IS IN THE FOLLOWINGS.  ☐ YES
    ☐ METHOD FOR SPECIFYING BOX DATA TRANSMITTING DESTINATION ⎫
    ☐ METHOD FOR PRINTING BOX DATA                            ⎪
    ☐ METHOD FOR SEARCHING BOX DATA                           ⎬ 67
    ☐ METHOD FOR COPYING BOX DATA                             ⎪
    ☐ METHOD FOR ACCESSING TO SECRET BOX                      ⎭

YOUR QUESTION IS NOT IN THE ABOVE QUESTIONS.  ■ YES → START RECORDING WITH START BUTTON ⎫ 69
                                                      END RECORDING WITH START BUTTON   ⎭

*Fig. 16*

| USER ID | CALLBACK DEVICE 1 | CALLBACK DEVICE 2 | CALLBACK DEVICE 3 |
|---|---|---|---|
| Takahashi | PC1 (192.*.*.*) COMMUNICATION SOFTWARE A | CELLULAR PHONE 1 (090--) | TELEPHONE 1 (03--**) |
| Uchida | CELLULAR PHONE 2 (090-**-) | PC2 (192.*.*.*) COMMUNICATION SOFTWARE B | TELEPHONE 2 (03-**-**) |
| Tamai | TELEPHONE 3 (03-**-) | CELLULAR PHONE 3 (090--) | PC3 (192.*.*.*) COMMUNICATION SOFTWARE A |
| Hashimoto | CELLULAR PHONE 4 (090-**-) | TELEPHONE 4 (03--) | PC4 (192.*.*.*) COMMUNICATION SOFTWARE B |

31b

C7, C8, C9, C10

IMAGE-PROCESSING APPARATUS WITH ONLINE SUPPORT FUNCTION

TECHNICAL FIELD

The present invention relates to an image processing apparatus, and particularly relates to a user support function of the image processing apparatus.

BACKGROUND ART

Conventionally, a manual containing a using method is attached to image processing apparatuses, and in general users refer to the manual so as to learn the using method of the functions provided to the image processing apparatuses.

However, in recent years, image processing apparatuses have a lot of functions, and the respective functions cooperate with each other so that complicated image processes can be executed. In such a circumstance, only when the manual attached to the image processing apparatuses contains detailed description, it is difficult for the users to sufficiently master the image processing apparatuses.

Therefore, in order to quickly solve troubles relating to the image processing apparatuses, manufacturers mostly set up support centers that are connected to the users or the image processing apparatuses via communication lines such as telephones or computer networks so as to support the users.

Conventional technologies relating to user support techniques are illustrated below with reference to some conventional technical documents.

Patent Document 1 (Japanese Patent Application Laid-Open No. 2001-309454) discloses a method for remotely monitoring business office devices. In the method described in Patent Document 1, a log file recorded by a business office device is periodically transmitted to a service center by a communication program. In the service center, the log file is analyzed, and when a warning or an error is detected, the log file is sent to a maintenance group. The maintenance group repairs the business office device using the log file. The invention in Patent Document 1 is an invention for trying to realize the quick and accurate maintenance of the business office device using a remote repair unit.

Patent Document 2 (Japanese Patent Application Laid-Open No. 2002-142059) also relates to a method for remotely monitoring an office device. In the method described in Patent Document 2, a communication control apparatus of the office device is connected to a central control apparatus via a wireless communication line, and the central control apparatus is connected to a host computer via a public line. The office device performs data communication and voice communication with the host computer using a communication path established in such a manner. The invention in Patent Document 2 is an invention for trying to reduce user's time and effort at a time when a fault occurs in the office device.

Patent Document 3 (Japanese Patent Application Laid-Open No. 2004-201181) discloses an image processing apparatus that can make an acknowledgment according to a generated failure after a user' learning level is taken into consideration. In the image processing apparatus in Patent Document 3, when a failure occurs, a step of reading data about an acknowledgement level is executed. Thereafter, occurrence of a failure is acknowledged, an E-mail concerning a report on the occurrence of a failure is created and transmitted based on the read acknowledgment level. The invention in Patent Document 3 is an invention for trying to improve efficiency of a support service at the time when a failure occurs in the image processing apparatus and user's work efficiency.

Patent Document 4 (Japanese Patent Application Laid-Open No. 2005-88322) discloses a printing support system at the time when a printing failure occurs. In the printing support system of Patent Document 4, a support center analyzes data to be used for printing output in an output apparatus so as to eliminate a failure, and performing the printing using the data so as to send the data to a user. The invention in Patent Document 4 is an invention for trying to secure printed matters even when a printing failure occurs.

PRIOR ART DOCUMENTS

Patent Documents

Patent Document 1: Japanese Patent Application Laid-Open No. 2001-309454
Patent Document 2: Japanese Patent Application Laid-Open No. 2002-142059
Patent Document 3: Japanese Patent Application Laid-Open No. 2004-201181
Patent Document 4: Japanese Patent Application Laid-Open No. 2005-088322

SUMMARY OF INVENTION

Technical Problem

Methodologies of various support systems utilizing a communication line are already proposed (hereinafter in this specification, to support users utilizing the communication line is called online support service). However, in the methodologies of the conventional support systems, the online support service does not sufficiently provide a method for operating an image processing apparatus or the like in an easily understood manner to user.

It is an object of the present invention to provide an image processing apparatus with which a user can get an online support service by means of an intuitive and simple operation.

Solution to Problem

In accordance with an aspect of the present invention, there is provided an image processing apparatus including: a user operation data retaining section for retaining user operation data in which user operation contents are recorded; an input section having a help key for instructing start of execution of an online support function; and a support data retaining section for retaining information about a support connecting destination to be connected on a online support, wherein when pressing of the help key is recognized, at least a part of the contents of the user's operation performed until the pressing is gained by referring to the user operation data, and a support connecting destination according to the gained user operation contents is selected by referring to the support data retaining section, so that connection of communication with the selected support connecting destination is requested.

In the above aspect, the image processing apparatus further may include a transmitting section for transmitting the user operation data that is retained in the user operation data retaining section and represents the contents of the operation performed by the user until the time point of the pressing of the help key to the selected support connecting destination.

In the above aspect, the image processing apparatus further may include a display section for displaying information received from the support connecting destination; and a transmission/reception information determining section for registering a job related with the user based on job remote registration data for remotely registering a job received from the support connecting destination, wherein the display section displays a button corresponding to the job.

In the above aspect, when login of the user is accepted, the display section may display the button correspondent with the job related with the user.

In the above aspect, when user's pressing of the button is recognized, the job related with the button may be called, when pressing of the help key is recognized with the job being called, connection of communication with the support connecting destination to which the job remote registration data is transmitted may be requested.

In the above aspect, callback destination specification data for specifying at least any one of the image processing apparatus, a personal computer connected to the image processing apparatus and a cellular phone as a callback destination communication apparatus from the support connecting destination may be transmitted to the support connecting destination.

In the above aspect, the communication apparatus used by the user for connecting to the image processing apparatus may be maintained as a candidate of the callback destination communication apparatus.

In the above aspect, the callback destination specification data may be transmitted to the support connecting destination, and question data input by the user may be transmitted to the support connecting destination.

In the above aspect, the question data may be generated by the image processing apparatus based on voice data input by the user via a microphone provided to the image processing apparatus.

In the above aspect, the question data may be generated by the image processing apparatus based on a question selected from a list of questions displayed on the display section by the user.

In the above aspect, the question displayed in the list of the questions displayed on the display section may be selected to be displayed by referring to the data of the user's operation.

In the above aspect, the image processing apparatus further may include a callback communication relay module for relaying the communication between the support connecting destination and the callback destination communication apparatus.

In the above aspect, the callback communication relay module may relay the callback communication using a data format suitable for communication software to operate on a personal computer as the callback destination communication apparatus.

In the above aspect, the image processing apparatus may receive data input via the communication software and may be operated based on the received data.

In accordance with another aspect of the present invention, there is provided an online support method in an image processing apparatus including: a step of recording user operation data including contents of user's operation into a user operation data retaining section; a step of displaying an input section having a help key for instructing start of execution of an online support function; a step of referring to the support data retaining section for retaining information about a support connecting destination to be connected on an online support; a step of, when pressing of the help key is recognized, gaining at least a part of the contents of the user's operation performed until a time point of the pressing with reference to the user operation data; a step of selecting a support connecting destination according to the gained user operation contents with reference to the support data retaining section; and a step of requesting connection of communication with the selected support connecting destination.

ADVANTAGEOUS EFFECTS OF INVENTION

In the image processing apparatus according to the present invention, a user only performs an intuitive and simple operation so as to be capable of getting desired online support services.

BRIEF DESCRIPTION OF DRAWINGS

FIG. 3 is a block diagram illustrating a functional constitution of the MFP 1;

FIG. 4 is a pattern diagram illustrating a flow of an online support according to a first embodiment;

FIG. 7 illustrates an example of a support database 31a;

FIG. 9B is a flowchart illustrating a process to be execute by the MFP 1 according to the first embodiment;

FIG. 11 is a pattern diagram illustrating a flow of the online support according to a second embodiment;

FIG. 14 illustrates a display example of the display section 3 of the MFP 1;

FIG. 15 illustrates a display example of the display section 3 of the MFP 1; and FIG. 16 illustrates an example of a callback destination registration database 31b.

DESCRIPTION OF EMBODIMENTS

The present invention relates to an image processing apparatus, and particularly relates to an online support function in an image processing apparatus.

An online support service is for providing support services (solving troubles, eliminating unclear points of operations) to a user of the image processing apparatus or the image processing apparatus, that is connected to a support service point (service hub) via a communication line, through communication using the communication line.

The image processing apparatus according to the present invention is a digital multifunction processor (MFP) having a scanner function, a printer function, a copying function, a facsimile function, an E-mail function and a document server function in the embodiment. However, the image processing apparatus according to the present invention is not limited to the MFP.

The image processing apparatus according to the present invention has a unit that communicates with an online support service point (so-called a support center or a service hub where service staff is resident). The communication unit may be, for example, an internet, a public telephone line or the like. The communication unit does not have to be contained in the image processing apparatus, and may be connectable as an external apparatus to the image processing apparatus. In this case, the image processing apparatus may communicate with the online support center utilizing the communication unit as the connected external apparatus.

(First Embodiment)

<Constitution of Image Processing Support System>

Figure 1:
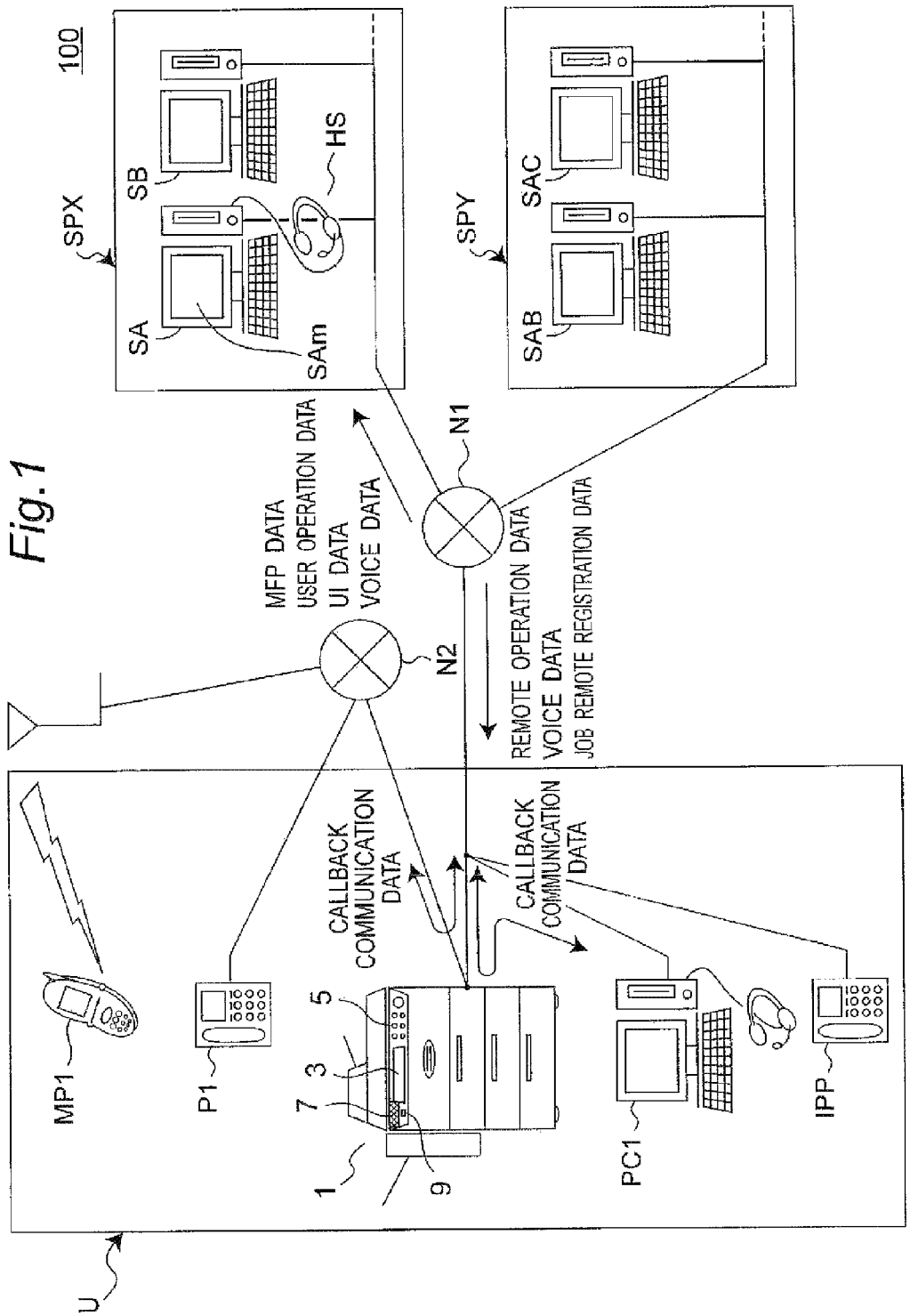
FIG. 1 is a conceptual diagram illustrating a support system 100 of an image processing apparatus.

FIG. 1 is a conceptual diagram illustrating an image processing apparatus support system 100 including an image processing apparatus (MFP 1) and online support points SPX and SPY according to the first embodiment of the present invention.

A user side apparatus (U) has the MFP 1, and may further include an information processing apparatus (personal computer PC1) and an internet telephone IPP connected to the MFP 1 by a network N1 such as an internet, and a cellular phone MP1 and a telephone P1 connected to the MFP 1 by a network N2 such as a public telephone network. The MFP 1 has a display section 3, an input section 5, a speaker 7 and a microphone 9 as user interfaces.

The online support point SPX has personal computers (support PCs) SA and SB for support staff connected to the MFP 1 by the network N1. The support PC (SA) has a monitor SAm as a display section and a keyboard as an input section, and further may has a head set HS with a speaker and a microphone. Not shown, but the other support PCs (SB) may have the similar constitution. Details are described later, but the monitor SAm can display a state of the MFP 1 at real time, and the support staff can remotely operate the MFP 1 utilizing the display.

The online support point SPY also has personal computers (support PCs) SAB and SAC for support staff connected to the MFP 1 by the network N1. The support PCs (SAB, SAC) of the online support point SPY also may have the constitution similar to that of the support PC (SA) of the online support point SPX.

The online support points SPX and SPY are support hubs composing the online support center. The online support center has a plurality of service hubs according to support areas, support languages and support technical contents. Further, plural members of support staff are resident at each online support point. Plural kinds of technical fields and used languages which the support staff is in charge of, and time zones in which the support staff engages in the support are present with each member of the support staff redundantly engaging in a plurality of services. The support staff engages in the support services normally using dedicated support PCs.

In the online support service according to the embodiment of the present invention, the MFP 1 can transmit MFP data, user operation data, UI data, and voice data to the support PC (SA or the like). The MFP data is an identifier of the self apparatus. Contents of user's operations performed while the user logs into and requests of the online support (pressing down an online help key) are described into the user operation data. The UI data represents display states or the like of user interfaces of the MFP. The voice data is obtained by converting user's voices.

The support PC (SA) of the support center can transmit remote operation data for remotely operating the MFP 1, voice data obtained by converting voices of the support staff, and job remote registration data for remotely registering jobs into the MFP 1 to the MFP 1.

When the MFP 1 receives callback from the support staff, it transmits the callback to a specified communication apparatus (cellular phone MP1, telephone P1, personal computer PC1, internet telephone IPP or the like), and can relay the transmitted data from the communication apparatus (MP1, P1, PC1, IPP or the like) to which it transmitted the callback to the support staff.

In the drawing, data that is exchanged between the communication apparatus (MP1, P1, PC1, IPP or the like) and the support PC (SA or the like) of the support staff in relay by the MFP 1 at the time of the callback is called callback communication data.

The callback communication data includes voice data, textual data, data for reproducing display contents of the display section 3 of the MFP 1, data for remotely operating the MFP 1, data for remotely registering jobs into the MFP 1, and data for remotely operating the MFP 1 so as to transmit instructions for executing the jobs.

<Hardware Structure of the Image Processing Apparatus>

Figure 2:
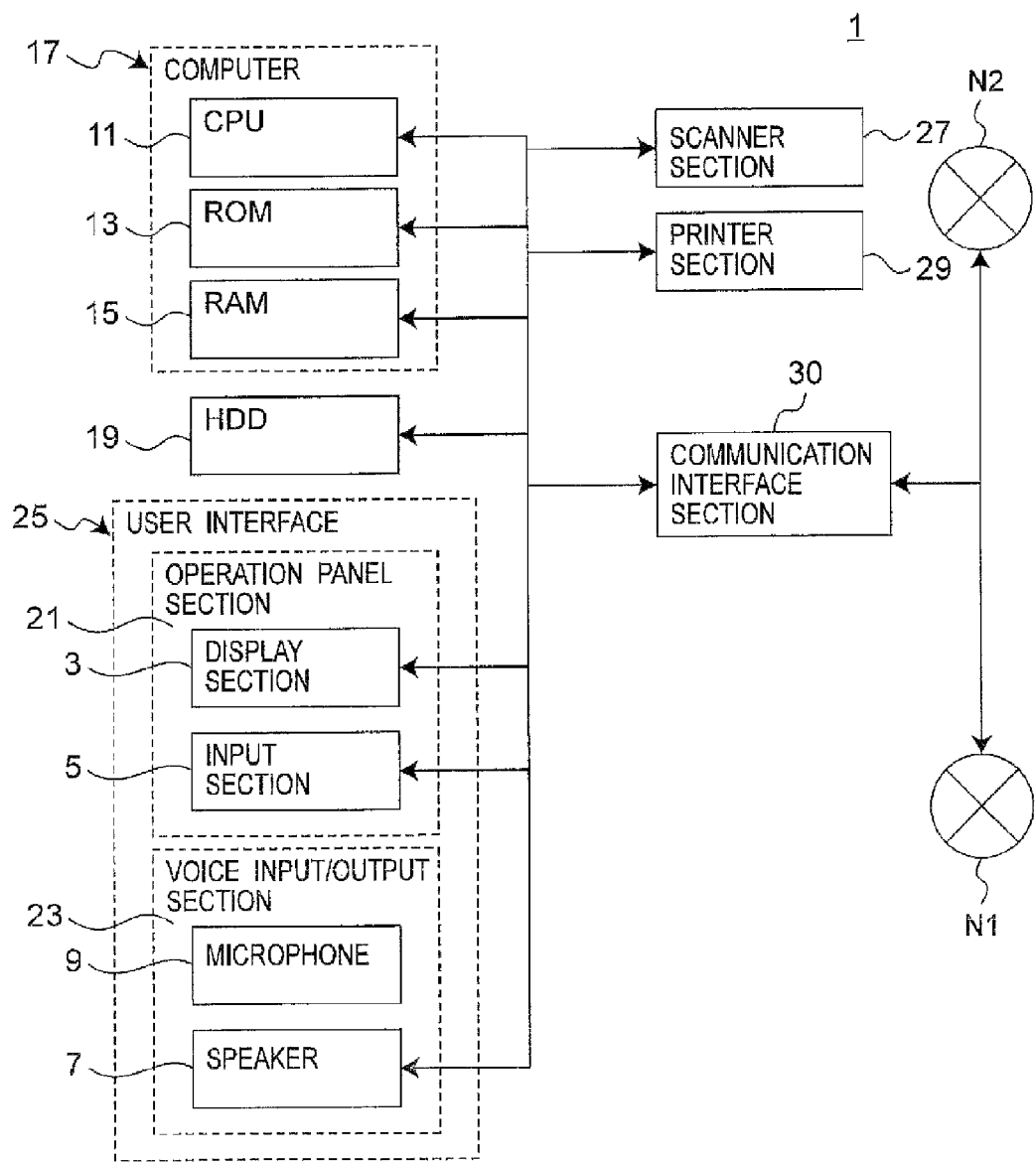
FIG. 2 is a block diagram illustrating a hardware structure of MFP 1.

FIG. 2 is a block diagram illustrating a hardware structure of the MFP 1 according to the first embodiment.

The MFP 1 has a central processing unit (CPU) 11, a read-only memory (ROM) 13, a random access memory (RAM) 15, a hard disc drive (HDD) 19, the display section 3 as the user interface, the input section 5 as the user interface, the microphone 9, the speaker 7, a scanner section 27, a printer section 29, a communication interface section 30 (network interface card (NIC), modem or the like). The CPU 11 controls various data operating processes and control processes of the respective sections of the MFP 1. The ROM 13 stores programs to be executed by the CPU 11. The RAM 15 stores programs to be executed by the CPU 11 and various data. The HDD 19 stores image data or the like. The microphone 9 inputs voices generated by users. The speaker 7 provides voice information to users. The scanner section 27 optically scans paper documents or the like and generates electronic data. The printer section 29 forms image information on paper media from the electronic data. The communication interface section 30 communicates with external apparatuses via the computer network N1 such as an Internet and the public telephone line network N2 or the like.

The CPU 11, the ROM 13 and the RAM 15 compose a computer 17. The ROM 13 and the RAM 15 compose a main storage device of the computer 17, and the HDD 19 composes an auxiliary storage device of the computer 17.

The display section 3 and the input section 5 compose an operation panel section 21, and the microphone 9 and the speaker 7 compose a voice input/output section 23. The operation panel section 21 and the voice input/output section 23 form a user interface 25.

The computer 17 executes the programs of the present invention so as to realize the image processing apparatus according to the embodiment of the present invention. The programs may be installed into the main storage device or the auxiliary storage device of the computer 17 so as to be executed.

In the user interface 25, the input section 5 includes a plurality of keys for inputting numerical values, texts and symbols, a sensor for recognizing pressed keys, and a transmission circuit for transmitting signals representing the pressed keys to the CPU 11. The display section 3 is a display device that displays a screen presenting information to a user, a screen for sending an instruction to the user, a screen for the user to input settings, and a screen for displaying an image formed by the image process to be executed by the MFP 1. In the first embodiment, the display section 3 is composed of a liquid crystal touch panel. The liquid crystal touch panel has a function for detecting a portion touched by the user on the display screen. This function is the function of the display section 3 and simultaneously provides a function of the input section 5. The input section 5 and the display section 3 as well as the microphone 9 and the speaker 7 compose the user interface 25 for the user to input/output information into/from the MFP 1.

<Functional Constitution of the Image Processing Apparatus>

FIG. 3 is a block diagram illustrating a functional constitution of the image processing apparatus according to the first embodiment. In FIG. 3, components provided as devices are also shown in a hardware format, and an overview of the MFP 1 can be understood. The components that are the same as those in FIG. 1 or 2 are denoted by the same reference numerals.

The functional block shown in FIG. 3 is a functional block that is realized by executing the programs by means of the CPU 11 of the computer 17 shown in FIG. 2. The programs do not have to be one program, and may be constituted by a plurality of programs composing respective functional modules.

The MFP 1 has a main control module 41. The main control module 41 controls the respective blocks of the MFP 1, and suitably exchanges data between the respective blocks. At the same time, the main control module 41 can suitably process the data via the exchange of the data. Further, the control is made at suitable timing based on publicly-known techniques.

An information determining module 43 has a user operation information determining module 45, a paired remote destination transmission/reception information determining module (hereinafter abstracted "paired-tr-info-det module") 47, and a remote operation information determining module 49.

The user operation information determining module 45 of the information determining module 43 controls exchange of information with the user via the input/output information control module 39 and via the user interface 25 of the MFP 1, and determines the input information so as to process the information.

The user operation information determining module 45 can recognize operations of the various keys provided to the input section 5, such as user's pressing of the online help key. When the user input information via the user interface 25, the user operation information determining module 45 determines contents of the input, and suitably posts the contents to the main control module 41. The contents input by the user are maintained as user operation log data into a user operation log data retaining section 33, described later.

The paired-tr-info-det module 47 of the information determining module 43 controls transmission/reception of information with the external apparatus for remotely operating the MFP 1.

The paired-tr-info-det module 47 controls the remote access control module 55, and receives remote operation data received from the external apparatus remotely operated so as to send the remote operation data to the remote operation information determining module 49.

Further, the paired-tr-info-det module 47 sends the data to the external apparatus remotely operated from the MFP 1. This data may include support connecting destination data, MFP data, user operation data, UI data and voice data. The support connecting destination data is for specifying an address of a support connecting destination as a provider of the online support service. The MFP data is the identifier of the self apparatus. At least a part of contents of the user operation performed while the user logs into and requests of the online support (pressing of the online help key) is described into the user operation data. The UI data represents the display state of the user interface of the MFP. The voice data is obtained by converting a user's voice.

When the paired-tr-info-det module 47 receives the job remote registration data for registering jobs into the MFP 1 from the external apparatus for remotely operating the MFP 1, it registers the jobs into the MFP 1 based on the job remote registration data. Further, the module 47 executes a process for displaying one-touch keys for calling the registered jobs on the display section 3.

The remote operation information determining module 49 of the information determining module 43 operates the MFP 1 based on the remote operation data from the external apparatus for remotely operating the MFP 1. The external apparatus for operating the MFP 1 is, for example, the support PC (SA) as the support connecting destination.

The data retaining section 19 retains control data or the like necessary for controlling the entire apparatus. The data retaining section 19 has a database section (DB) 31, a user operation log data retaining section 33, a remote registration job data retaining section 35, and a box 37.

The database section (DB) 31 has a support database 31*a*, and a user information database 31*c* and the like. The support database 31*a* has information about a support connecting destination, which information is provided for online support. In the database, the support connecting destination is recorded together with information about corresponding language, corresponding time zone, a technical field for pertaining the support, and an address of the support connecting destination (name of the support PC). When the user presses down the online help key, the user operation information determining module 45 that recognizes the pressing posts the pressing of the online help key to the main control module 41 and the paired-tr-info-det module 47. The paired-tr-info-det module 47 refers to the user operation log data retained in the user operation log data retaining section 33 and the support database 31*a* so as to determine a suitable support connecting destination according to the user's operations.

The user information database 31*c* retains information about the user registered in the MFP 1, and the database is referred to when a request of the online support is transmitted to the support connecting destination at the time when the user logs into the MFP 1.

The remote registration job data retaining section 35 retains data about the jobs remotely registered from the support connecting destination.

The box 37 is an area where document data or the like retained in the MFP 1 is retained.

The input/output information control module 39 has a browser module 39*a*, a voice synthesizing module 39*b* and a voice recognizing module 39*c*.

The browser module 39*a* of the input/output information control module 39 is used for constituting the display section 3 and the input section 5 of the user interface 25. The browser module 39*a* can display the job contents registered by the remote operation and can display the one-touch keys for calling the registered jobs as a part of the input section 5 on the display section 3.

The voice synthesizing module 39*b* of the input/output information control module 39 receives data representing a voice so as to generate a voice signal and transmits it to the speaker 7.

The voice recognizing module 39*c* of the input/output information control module 39 receives the voice signal from the microphone 9, analyzes the voice data or a voice from the voice signal so as to generate textual information data, and sends it to the user operation information determining module 45.

A PDL analyzing module 51 analyzes data described by a page description language (PDL), converts it into image data so as to send the image data into the main control module 41 or the like.

An E-mail transmitting/receiving module 53 converts the data received as an E-mail into image data so as to send it to the main control module 41 or the like. The E-mail transmitting/receiving module 53 creates data about an E-mail to be transmitted from the MFP 1 via the communication interface 31.

A callback communication relay module 57 and a callback destination registration database 31*b* are described in detail in the description about a second embodiment.

<Flow of Process In the First Embodiment>

A flow of a process of the online support function in the image processing apparatus according to the first embodiment of the present invention is described below.

FIG. 4 is a diagram for overviewing a process between the image processing apparatus and the support PC as the support connecting destination according to the first embodiment along a time series.

The online support according to the first embodiment is overviewed with reference to FIG. 4.

The user operates the MFP 1 in order to log into the MFP 1 and execute a desired process. During the operation, the user presses down the online help key displayed on the display section 3 in order to inquire of the online support about an operating method (I in the drawing).

The MFP 1 recognizes the pressing of the online help key, and refers to the user operation log data so as to recognize the contents of the user's operation at the time point of pressing down the online help key. The MFP 1 selects a PC of the support (support staff) that is the most suitable for supporting items relating to the operation contents as the support connecting destination (II in the drawing). In the selection of the support connecting destination, a current operation stage of the MFP 1, a language selected as a language composing the display section 3, an area where the MFP 1 is installed, and a current time can be taken into consideration.

The MFP 1 tries to connect to the selected support connecting destination (III in the drawing).

When the communication with the support connecting destination is established, the MFP 1 transmits MFP data, user operation data and the like to the support connecting destination (support PC) (IV in the drawing).

The support PC receives the MFP data, the user operation data and the like, and the support staff starts the support service based on these data. In the support service, the user and the support staff may implement the support service using voices by means of transmission/reception of the voice data and the like. The support staff remotely operates the MFP 1 using the support PC so as to be capable of explaining the method for operating the MFP 1 to the user (V in the drawing).

When a job that can be called and executed according to a user's necessity should be registered into the MFP 1 because of the determination of the support staff, the job can be remotely registered into the MFP 1 via the support PC. In this case, the support PC transmits to the MFP 1 job remote registration data in which contents of the job to be registered are described. Further, the support staff can transmit an instruction for registering a one-touch key (one-touch key setting data) that enables the calling of the job with one touch to the MFP 1 (VI in the drawing).

The MFP 1 that receives the job remote registration data and the one-touch key setting data sets the registration of the job related with the user into the self apparatus, and sets a button (one-touch key) for calling the job with one touch to the display section 3 and the input section 5 (VII in the drawing).

The user presses down the one-touch key set to the MFP 1 so as to call the remote registration job (VIII in the drawing).

When the user presses down an execution key, the MFP 1 executes the called remote registration job (IX in the drawing).

When the MFP 1 transmits the operation contents at the time of user's pressing of the online help key to the support connecting destination, immediate start of smooth support is enabled. The MFP 1 selects a suitable support connecting destination based on the operation contents at the time of user's pressing of the online help key and tries connection. Thus, the user does not have to select the support connecting destination by him/herself. The user has to only press down the online help key. Thereafter, the MFP 1 automatically selects the support connecting destination, and establishes the connection so as to transmit the operation contents in MFP 1 up to the present to the support connecting destination.

The support staff of the support connecting destination can remotely register the job including a user's desirable process based on various data transmitted from the MFP 1 and question and answer by voice with the user. Since the registered job can be arbitrarily called and executed, the user accomplishes an original purpose in the support service.

A while later, the user again logs into the MFP 1 so as to be capable of again calling the job that is remotely registered a while ago. At this time, if the user again needs the support service, the user may presses down the online help key (X in the drawing).

When the MFP 1 recognizes the pressing of the online help key after the remote registration job is called (Ia in the drawing), the MFP 1 selects the support connecting destination for an additional support. At this time, the MFP 1 selects the support staff who remotely registers the called remote registration job as an additional support connecting destination (IIa in the drawing), so as to try the connection.

When the connection with the additional support connecting destination is established, the MFP 1 transmits the MFP data, the user operation data and the like to the additional support connecting destination (support PC) (IIIa in the drawing).

The support PC of the additional support connecting destination receives the MFP data, the user operation data and the like, and the additional support staff starts the additional support service based on the data. Also in the additional support service, the user and the support staff may implement mutually the support service by means of voices according to the transmission/reception of the voice data or the like. The additional support staff remotely operates the MFP 1 using the support PC, so as to be capable of explaining the method for operating the MFP 1 to the user. When contents of the remote registration job that are remotely registered a while ago should be modified based on the determination by the additional support staff, the contents of the remote registration job can be remotely modified. Further, when a new job should be registered according to the determination by the additional support staff into the MFP 1, the new remote registration job can be remotely set to the MFP 1 via the support PC (IVa in the drawing).

The MFP 1 stores the support connecting destination where the support staff remotely sets the remote registration job. When the user presses down the online help key with the remote registration job being called, reconnection to the support PC of the support staff where the remote registration job is set is established so as to enable immediate start of the additional support. Further, in the additional support, the support staff can modify contents of the remote registration job registered a while ago or can additionally set new remote registration job to the MFP 1. For this reason, the support staff can implement more detailed support service.

Figure 5A:
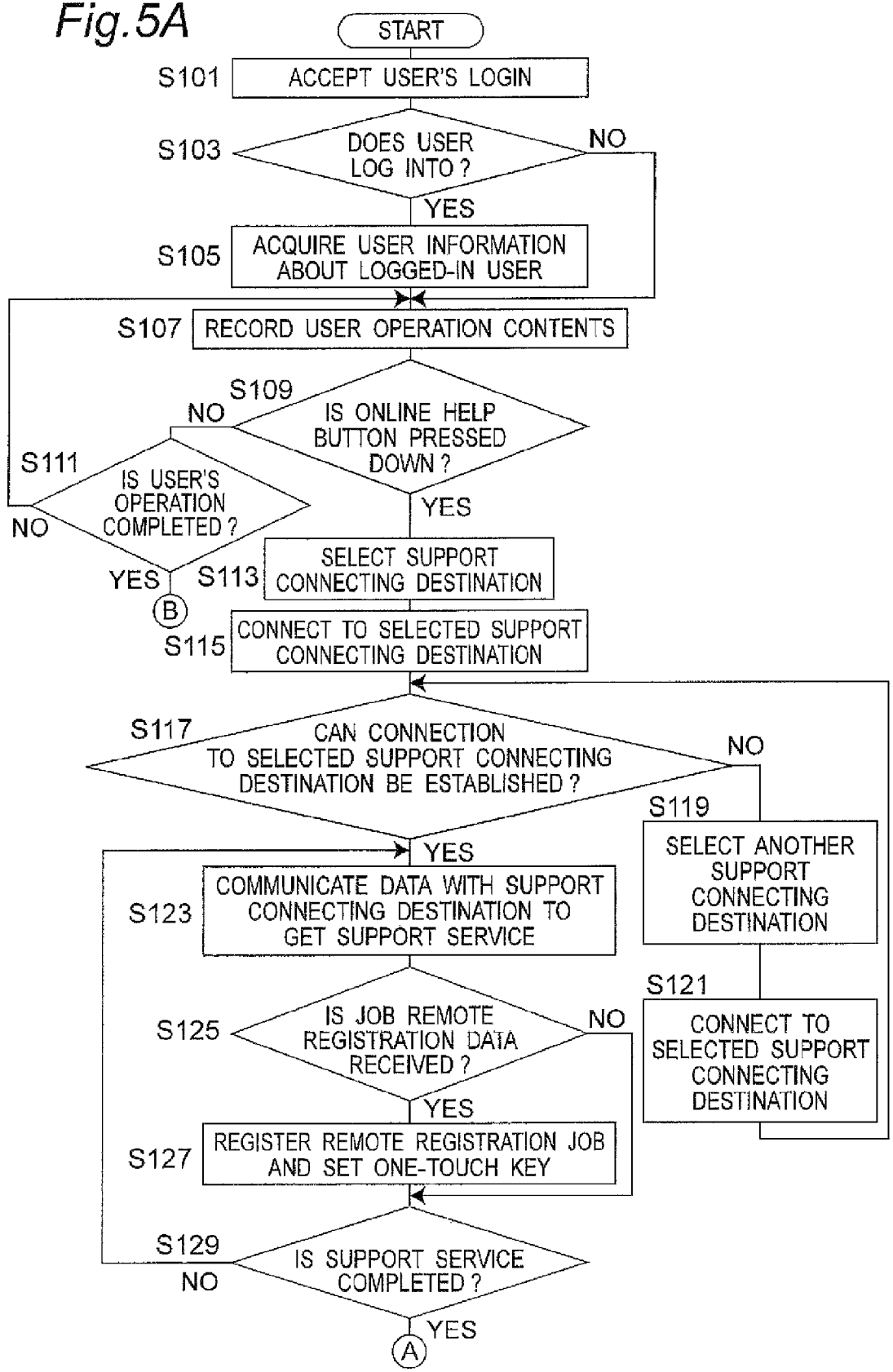
FIG. 5A is a flowchart illustrating a process to be executed by the MFP 1 according to the first embodiment.
Figure 5B:
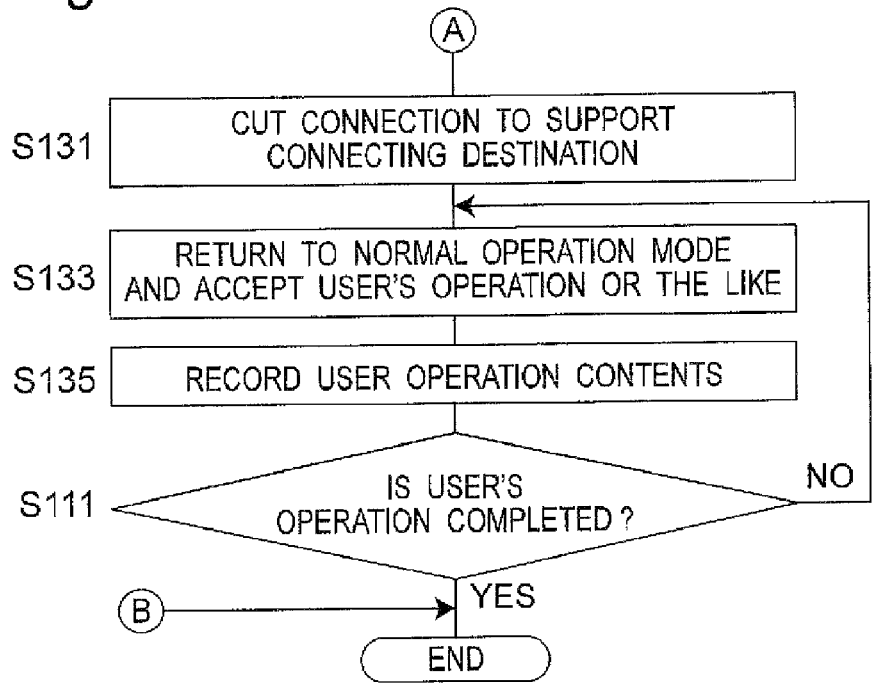
FIG. 5B is a flowchart illustrating a process to be executed by the MFP 1 according to the first embodiment.

The process in the MFP 1 according to the first embodiment is described below with reference to flowcharts. FIGS. 5A and 5B are flowcharts illustrating the process while the reception of user's login starts, the online support service is provided, and the user completes a predetermined operation.

The MFP 1 accepts the user's login at step S101.

The MFP 1 determines whether the user properly logs into the MFP 1 at step S103.

When the MFP 1 determines that the user properly logs into it ("YES" at step S103), the MFP 1 executes a process for identifying the logged-in user (step S105), and goes to step S107.

When the MFP 1 determines that the user does not properly log into it ("NO" at step S103), the MFP 1 recognizes the user as a guest user and goes to step S107.

The user operation information determining module 45 of the MFP 1 starts to record contents of an operation performed by the user at step S107. Concretely, it records the user operation contents into the user operation log data retained by the user operation log data retaining section 33.

The user operation information determining module 45 of the MFP 1 determines at step S109 whether the user presses down the online help key.

When the MFP 1 recognizes the pressing of the online help key ("YES" at step. S109), the process goes to step S113.

When the MFP 1 does not recognize the pressing of the online help key ("NO" at step S109), the process goes to step S111.

Figure 6:
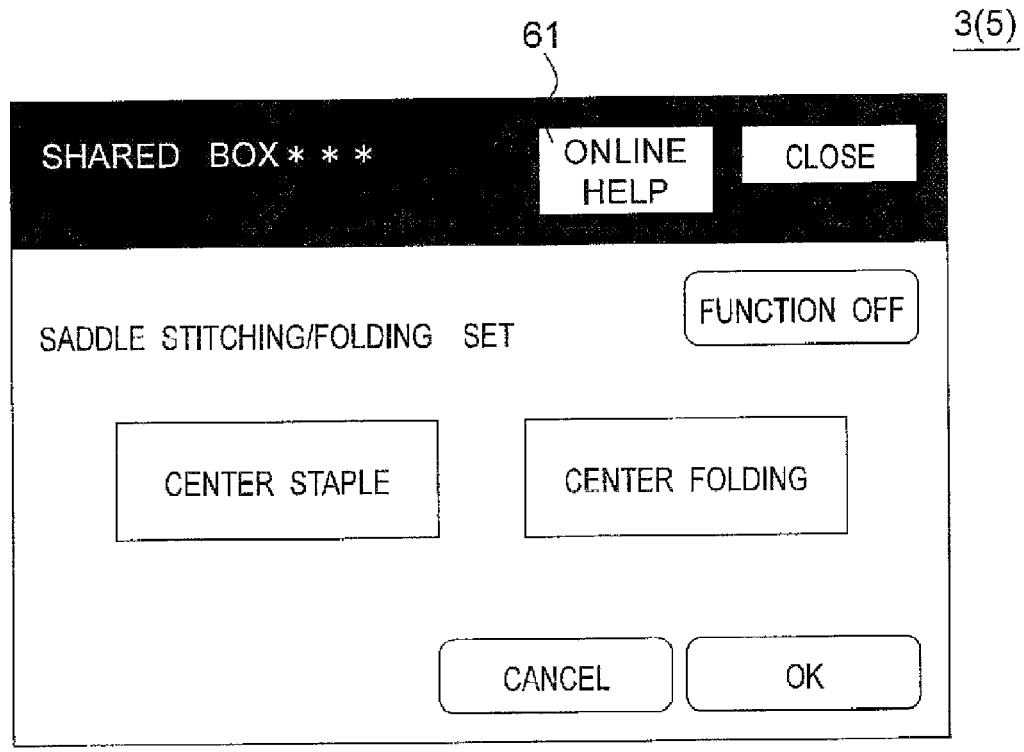
FIG. 6 illustrates a display example of a display section 3 of the MFP 1.

In relation with step S109, a constitution of the online help key is described. FIG. 6 is a diagram illustrating a display example of the display section 3 (input section 5) as the user interface. It is clear from FIG. 6 that the online help key 61 is provided to the display section 3. The online help key 61 is a key that is displayed on the display section 3 while the user can operate the MFP 1. The user presses down the online help key 61 so as to be capable of requesting the MFP 1 to provide the online support service.

The MFP 1 determines at step S111 whether the user's operation is completed.

When the MFP 1 determines that the user's operation is completed ("YES" at step S111), the process is ended.

When the MFP 1 determines that the user's operation is not completed ("NO" at step S111), the process returns to step S107.

At step S113 the main control module 41 of the MFP 1 checks the user operation contents at the time of pressing down the online help key 61 with reference to the user operation log data retained in the user operation log data retaining section 33 so as to select a support connecting destination from which the online support service is provided.

In relation with step S113, FIG. 7 illustrates an example of the support database 31*a* retained in the database section 31 of the data retaining section 19. The MFP 1 selects a support connecting destination suitable for receiving the support relating to the operation contents represented by the user operation log data based on the support database 31*a* (the support database 31*a* is not necessarily retained in a main body of the MFP 1, and may be in an obtainable state via the network). The support database 31*a* retains information about correspondent languages, correspondent time zones and correspondent technical fields of a plurality of support connecting destinations.

For example, when the user operation log data represents that the user operates using a Chinese display screen, the MFP 1 can select a support connecting destination correspondent with Chinese. The MFP 1 can select a support connecting destination compatible with a current support based on a timer contained in the MFP 1. Further, when the user operation log data represents that the user presses down the online help key while the communication function is being set, the MFP 1 selects a support connecting destination where the support of the communication function is enabled as the support connecting destination. Naturally, the MFP 1 can select one support connecting destination after a plurality of setting conditions (compatible language and technical field and the like) are taken into consideration.

The MFP 1 tries to establish the connection with the support connecting destination at step S115. As an example, the MFP 1 tries to establish the connection with the support PC (SA) (FIG. 1). The support PC (SA) corresponds to the support connecting destination A shown in FIG. 7, and support A means support staff who can cope with the supports in the technical fields such as printing and copying in the daytime zone in Japan.

The MFP 1 determines at step S117 whether the connection with the support PC (SA) as the support connecting destination is established.

When the MFP 1 determines that the connection with the support PC (SA) is established ("YES" at step S117), the process goes to step S123.

When the MFP 1 determines that the connection with the support PC (SA) is not established ("NO" at step S117), the process goes to step S119.

The MFP 1 selects another support connecting destination at step S119. The MFP 1 selects a support B (FIG. 7) as the support connecting destination.

The MFP 1 tries to establish a connection with the support B as another support connecting destination at step S121. In the technical theory, the connection with the support B may be established similarly to the connection with the support A. In this description, the description about the connection with the support B is omitted.

The following process where the MFP 1 can establish the connection with the support A at former step is described.

At step S123 the paired-tr-info-det module 47 of the MFP 1 first transmits MFP data, user operation data, UI data representing a display state of the user interface in the MFP 1, and the like to the support PC (SA). The user operation data is data created based on data extracted from the user operation log data by the MFP 1, and is for posting to the support PC (SA) a condition of the MFP 1 at a time point when the online help key 61 (FIG. 6) is pressed down.

Further, the paired-tr-info-det module 47 of the MFP 1 transmits/receives voices of the user and the support staff between the MFP 1 and the support PC (SA) during the support service so as to assist the support service. The support staff who operates the support PC (SA) transmits the remote operation data to the MFP 1 via the support PC (SA), and remotely operates the MFP 1 so as to be capable of demonstrating the method for operating the MFP 1 to the user.

In relation with step S125, the support staff who operates the support PC (SA) takes a user's demand into consideration and remotely registers into the MFP 1 the job where the operation contents which seem to satisfy the demand are described. At this time, the support PC (SA) transmits the job remote registration data where the job contents are described to the MFP 1.

The MFP 1 determines at step S125 whether the job remote registration data (and the one-touch key setting data) is received.

When the MFP 1 determines that the job remote registration data is received ("YES" at step S125), the process goes to step S127.

When the MFP 1 determines that the job remote registration data is not received ("NO" at step S125), the process skips step S127 so as to go to step S129.

At step S127 the paired-tr-info-det module 47 of the MFP 1 registers the remote job into the MFP 1 based on the received job remote registration data (and the one-touch key setting data), and performs setting for displaying a one-touch key for calling this job on the display section 3.

The MFP 1 determines at step S129 whether the support service between the MFP 1 and the support PC (SA) is completed.

When the MFP 1 determines that the support service is completed ("YES" at step S129), the process goes to step S131.

When the MFP 1 determines that the support service is not yet completed ("NO" at step S129), the process returns to step S123.

The MFP 1 cuts the connection with the support PC (SA) at step S131.

At step S133 the MFP 1 returns to the normal operating mode so as to accept an operation from the user or the like.

At step S135 similarly to step S107, the MFP 1 records user operation contents or the like into the user operation log data.

Step S111 is as already described.

The MFP 1 automatically selects a support connecting destination according to the operation contents at the time when the user presses down the online help key, so as to be capable of immediately starting the smooth support. For this reason, the user does not have to select the support connecting destination by him/herself, and the user can utilize the job remotely set by the support staff hereinafter.

Figure 9A:
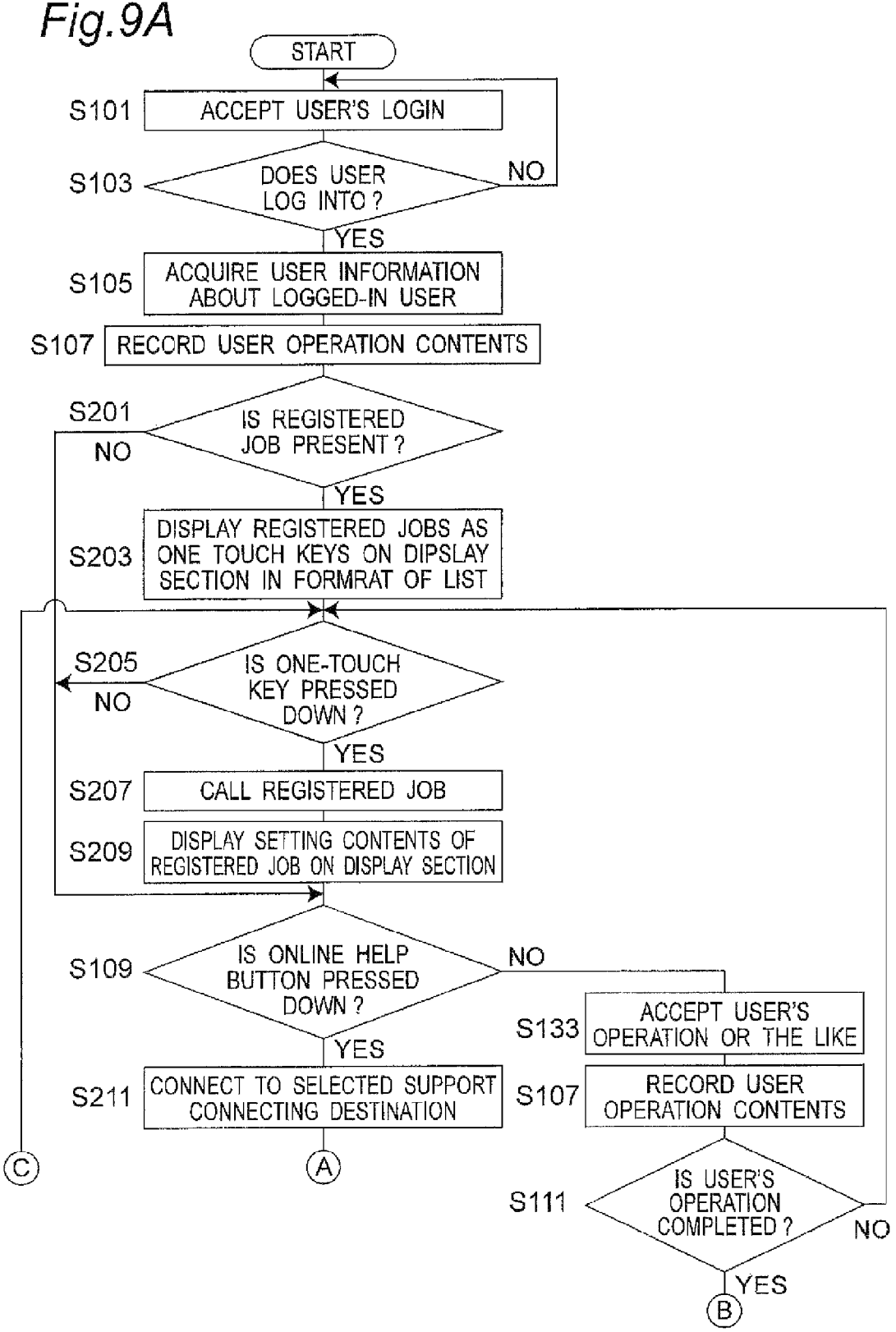
FIG. 9A is a flowchart illustrating a process to be executed by the MFP 1 according to the first embodiment.

A flow of the process in the MFP 1 when the user again presses down the online help key 61 at the time of using the job remotely registered into the MFP 1 is described below with reference to FIGS. 9A and 9B.

The MFP 1 accepts the user's login and calls information about the logged-in user at steps S101, S103 and S105. The information to be called here includes information about the job remotely registered from the support connecting destination at the previous login.

The MFP 1 starts to record the user operation contents at step S107.

The MFP 1 determines at step S201 whether the registered jobs are present.

When the MFP 1 determines that the registered jobs are present ("YES" at step S201), the process goes to step S203.

When the MFP 1 determines that the registered jobs are not present ("NO" at step S201), the process goes to step S109.

The MFP 1 displays a list of the registered jobs as a one-touch key on the display section 3 at step S203.

Figure 8:
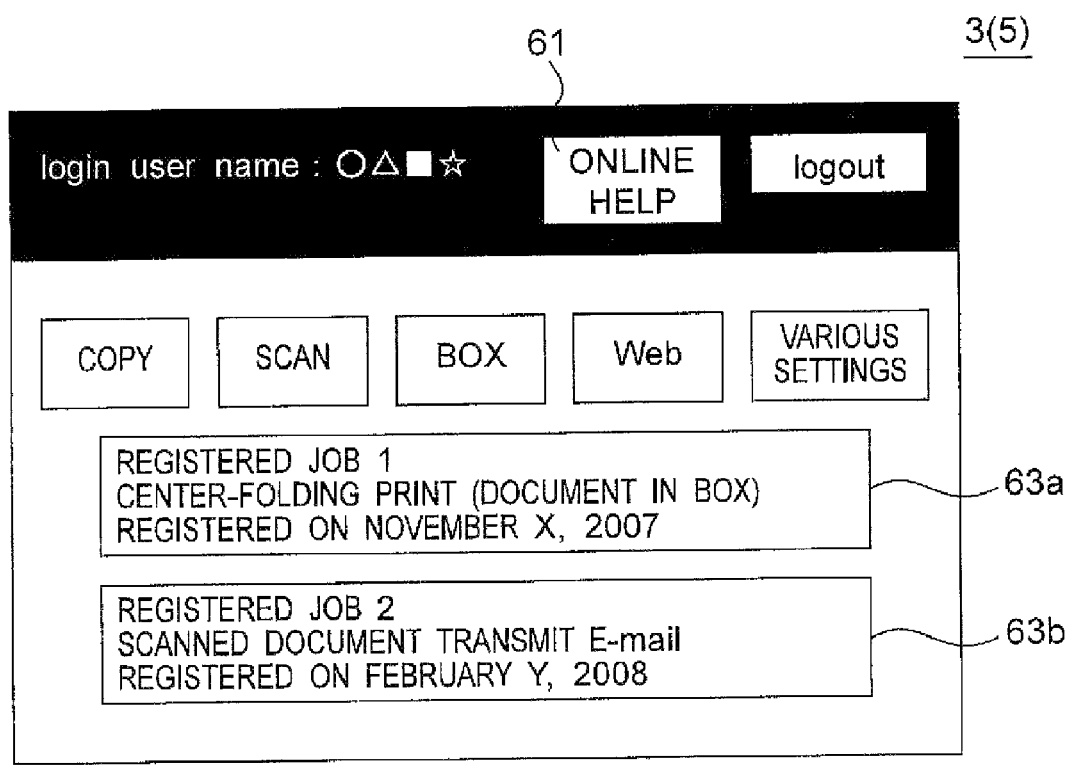
FIG. 8 illustrates a display example of the display section 3 of the MFP 1.

In relation with the process at step S203, FIG. 8 is a diagram illustrating a display example of the list of the registered job to be displayed as the one-touch key. One-touch keys 63a and 63b of the registered jobs are displayed on the display section 3 (input section 5) together with the online help key 61.

The MFP 1 determines at step S205 whether the one-touch keys 63a and 63b are pressed down.

For example, when the MFP 1 recognizes the pressing of the one-touch key 63a (registered job 1) ("YES" at step S205), the process goes to step S207.

When the MFP 1 does not recognize the pressing of the one-touch key ("NO" at step S205), the process goes to step S109.

At step S207 the MFP 1 displays details of the contents of the registered jobs corresponding to the pressed one-touch key (63a) on the display section 3.

Figure 10:
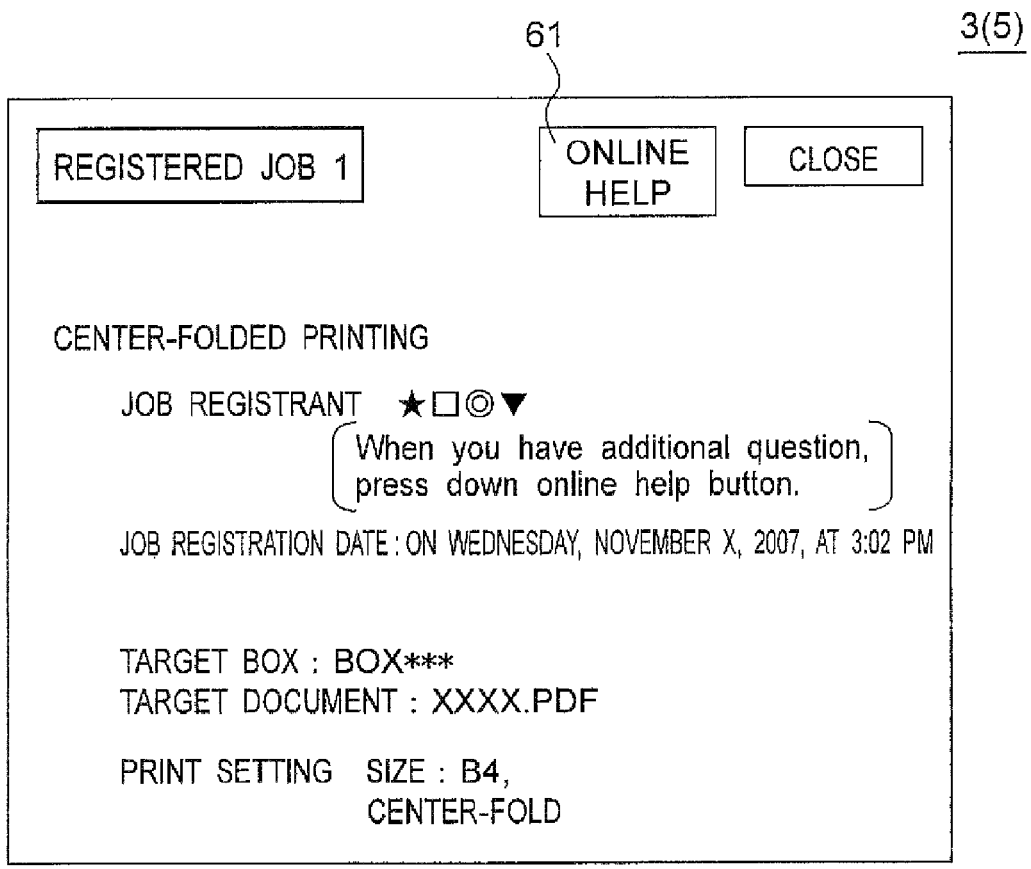
FIG. 10 illustrates a display example of the display section 3 of the MFP 1.

FIG. 10 is a diagram illustrating a display example of the details of the registered job. When the one-touch key (63a) is pressed down, the MFP 1 displays the details of the registered job on the display section 3. At this time, the online help key 61 is displayed (step S209).

The MFP 1 determines at step S109 whether the online help key 61 is pressed down. That is to say, the MFP 1 determines at step S109 whether the online help key 61 is pressed down in a state that the registered job is called.

When the MFP 1 determines that the online help key 61 is pressed down ("YES" at step S109), the process goes to step S211.

When the MFP 1 determines that the online help key 61 is not pressed down ("NO" at step S109), the process goes to step S133.

The respective processes at steps S133, s107 and S111 are as already described with reference to FIGS. 5A and 5B. The description about them is omitted.

The MFP 1 tries to connect to the selected support connecting destination at step S211. The selected support connecting destination may be a support connecting destination where the job is registered (for example, the support PC (SA).

The MFP 1 determines at step S117 whether the connection with the support connecting destination succeeds.

When the MFP 1 determines that the connection with the support connecting destination succeeds ("YES" at step S117), the process goes to step S123.

When the MFP 1 determines that the connection with the support connecting destination fails ("NO" at step S117), the process goes to S213.

The MFP 1 accepts input of contents of user's question at step S213. This input may be carried out by texts from the input section 5 such as a keyboard, selection from question options displayed on the display section 3, voice input via the microphone 9 or the like. When a question is input by a voice via the microphone 9, the MFP 1 may convert the voice into textual data through the voice recognizing module 39c.

At step S215 the MFP 1 transmits data where the question input by the user is described to the support PC (SA) as the support connecting destination. The support PC (SA) which receives the question presents the question to the support staff, and the support staff calls the user back so as to answer the question.

The communication is established between the MFP 1 and the support PC (SA) at step S123, and as described above, the user of the MFP 1 accepts the provision of the online support service.

In relation with step S217, the support staff who operates the support PC (SA) determines whether a previously registered job should be modified in communication with the user. When the support staff determines that the modification is necessary, the support staff transmits data for remotely modifying the contents of the remote registration job to the MFP 1 via the support PC (SA) in order to modify the job. The registered job to be modified may be a registered job that is called when the user presses down the online help key 61.

The MFP 1 determines at step S217 whether it receives the data (registered job modification data) for modifying the job from the support PC (SA).

When the MFP 1 determines that it receives the data for modifying the job from the support PC (SA) ("YES" at step S217), the process goes to step S219.

When the MFP 1 determines that it does not receive the data for modifying the job from the support PC (SA) ("NO" at step S217), the process skips the step S219 and goes to step S221.

At step S219 the MFP 1 modifies the remote registration job based on the received registered job modification data.

The MFP 1 determines at step S221 whether it receives data for registering a new remote registration job from the support PC (SA) (job remote registration data).

When the MFP 1 determines that it receives the new job remote registration data from the support PC (SA) ("YES" at step S221), the process goes to step S223.

When the MFP 1 determines that it does not receive the new job remote registration data from the support PC (SA) ("NO" at step S221), the process skips step S223 and goes to step S129.

The MFP 1 registers the new remote registration job based on the job remote registration data that is newly received at step S223.

The respective processes at steps S129, S131, S133, S135 and S111 are as already described with reference to FIGS. 5A and 5B. The description thereof is omitted.

When the user presses down the online help key with the remote registration job being called, the MFP 1 reconnects to the support PC of the support staff having set the remote registration job so as to enable immediate start of additional support.

(Second Embodiment)

The image processing apparatus according to a second embodiment of the present invention is described below.

The form according to the second embodiment of the present is also a digital multifunction processor (MFP). In MFP according to the second embodiment, a callback from support staff can be transmit to any communication apparatus specified by a user. Therefore, the MFP according to the second embodiment can relay communication between this arbitrary communication apparatus and a support PC operated by the support staff. Further, in combination with the relay of the communication, the MFP 1 can accept remote registration of a job from the support PC, and can be remotely operated by any communication apparatus.

<Constitution of Image Processing Support System>

A constitution of an image processing support system including the MFP according to the second embodiment may be similar to that of the support system 100 (FIG. 1) according to the first embodiment. For this reason, the description thereof is omitted.

<Hardware Structure of the Image Processing Apparatus>

A hardware structure of the MFP according to the second embodiment may be similar to the hardware structure (FIG. 2) of the MFP 1 according to the first embodiment. For this reason, the description thereof is omitted.

<Functional Constitution of the Image Processing Apparatus>

A functional constitution of the MFP 1 according to the second embodiment includes a lot of portions common with those of the MFP 1 according to the first embodiment. Description about the common portions is omitted.

FIG. 3 is a block diagram illustrating a functional constitution of the MFP 1 according to the second embodiment.

In the MFP 1 according to the second embodiment, the paired-tr-info-det module 47 of the information determining module 43 further controls the callback communication relay module 57.

When the callback communication relay module 57 receives a callback from the support PC (SA), it relays communication between specified callback destination and the support PC (SA). The callback means communication at the online-support that is started according to a connecting request from the support connecting destination to the MFP 1 after the MFP 1 cannot establish the connection with the support connecting destination in the online support started by user's pressing of the online help key 61.

The database section (DB) 31 of the data retaining section 19 has the callback destination registration database 31b. The callback destination registration database 31b is a database for retaining information about the communication apparatus for receiving callback communication from a support connecting destination specified by the user in advance.

<A flow of Process according to the Second Embodiment>

A flow of a process of the online support function in the image processing apparatus according to the second embodiment of the present invention is described below.

FIG. 11 is a diagram for overviewing the process between the image processing apparatus and the support PC as the support connecting destination according to the second embodiment along a time series.

The online support according to the second embodiment is described at first with reference to FIG. 11.

Similarly to the first embodiment, the user logs into the MFP 1, and operates the MFP 1 in order to execute a desired process. During the operation, the user presses down the online help key displayed on the display section 3 in order to inquire of the online support about the operating method (i in the drawing).

Similarly to the first embodiment, the MFP 1 recognizes the pressing of the online help key, and selects the PC of the support(support staff) that seems to be optimum for getting the support service as the support connecting destination (ii in the drawing).

The MFP 1 tries to connect to the selected support connecting destination.

When receiving data for posting that the support staff is not at the support connecting destination and is busy or being unable to get a reply from the support connecting destination (iii in the drawing), the MFP 1 request the user to input a callback destination (iv in the drawing).

The MFP 1 transmits data about the input callback destination (callback destination data) to the support connecting destination (v in the drawing).

The support staff, who returns to the support serviceable state for the MFP 1, performs callback based on the received callback destination data (vi in the drawing). In the callback, the support PC communicates with the MFP 1. The MFP 1 transmits contents of the callback communication from the support PC to the callback destination. As a result, the communication between the communication apparatus specified as the callback destination and the support PC is realized. As the callback destination, a personal computer, an internet telephone, a telephone, cellular phone and the like can be specified.

The user can ask and answer questions with the support staff of the support PC using communication software (for example, "NetMeeting" produced by Microsoft) in the personal computer PC1 specified as the callback destination (vii in the drawing). As the communication software, software for internet conference that is generally distributed can be used. Further, the user can observe the state of the remote operation of the support staff while referring to the remote display screen of the display section 3 of the MFP 1 displayed on a display of the PC1. The support staff can remotely register in the MFP 1 a job similarly to the first embodiment. Further, the user can execute the remote registration job using the PC 1 (viii in the drawing).

When the user cannot start the online support by means of the pressing of the online help key 61, the MFP 1 requests the user to specify a callback destination communication apparatus. Information about the callback destination communication apparatus is transmitted to the support connecting destination. In the support connecting destination that receives the information about the callback destination communication apparatus, the communication with the user is tried to be established based on the information. The communication in the callback is made with the MFP 1 being between the support PC as the support connecting destination and the communication apparatus specified as the callback destination. The MFP 1 can accept job remote registration data from the support connecting destination during the callback communication, and can accept remote operation data from the communication apparatus used by the user. Therefore, the user can get the online support so as to execute a desired process without approaching the MFP 1.

Figure 12A:
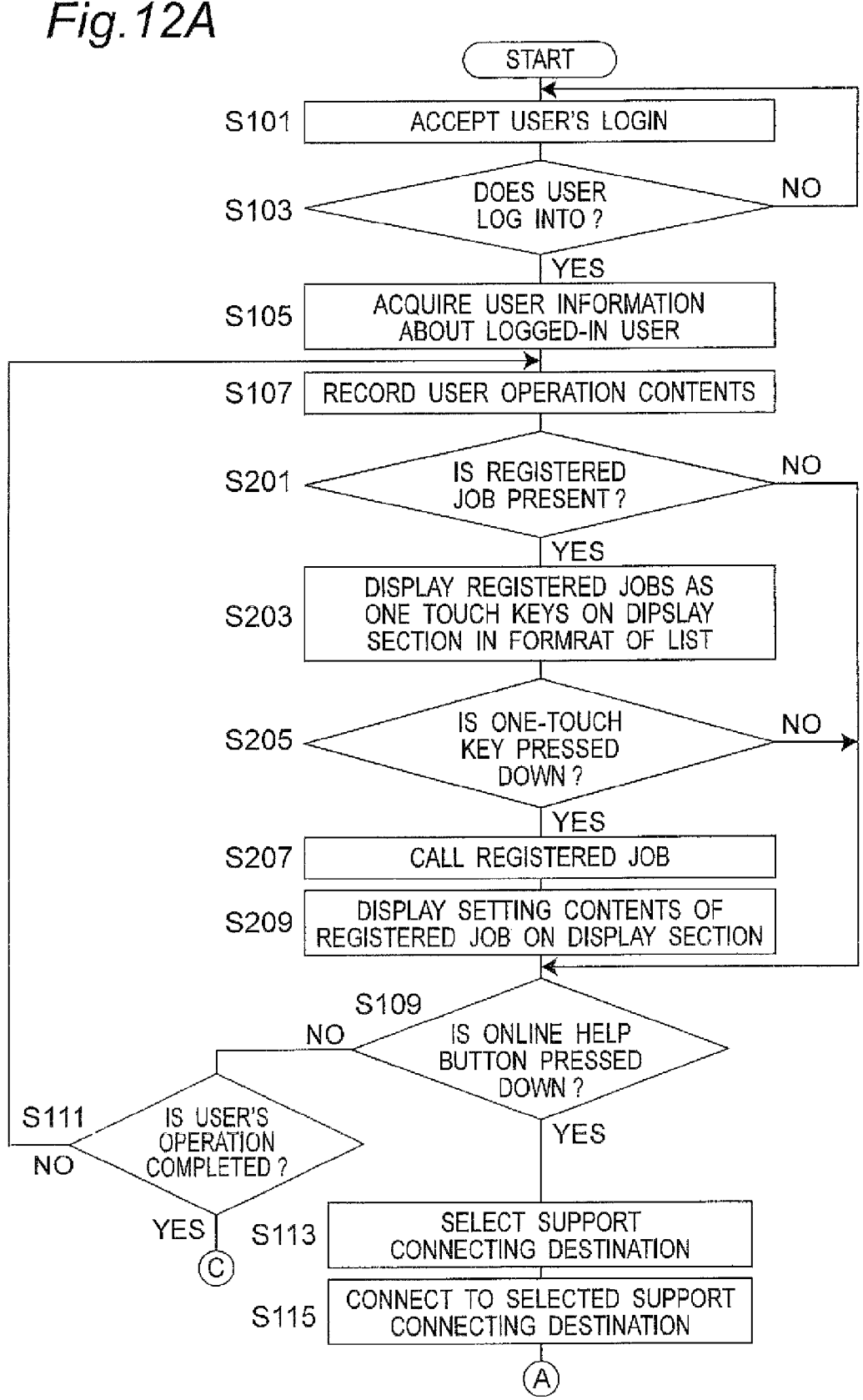
FIG. 12A is a flowchart illustrating a process to be executed by the MFP 1 according to the second embodiment.
Figure 12B:
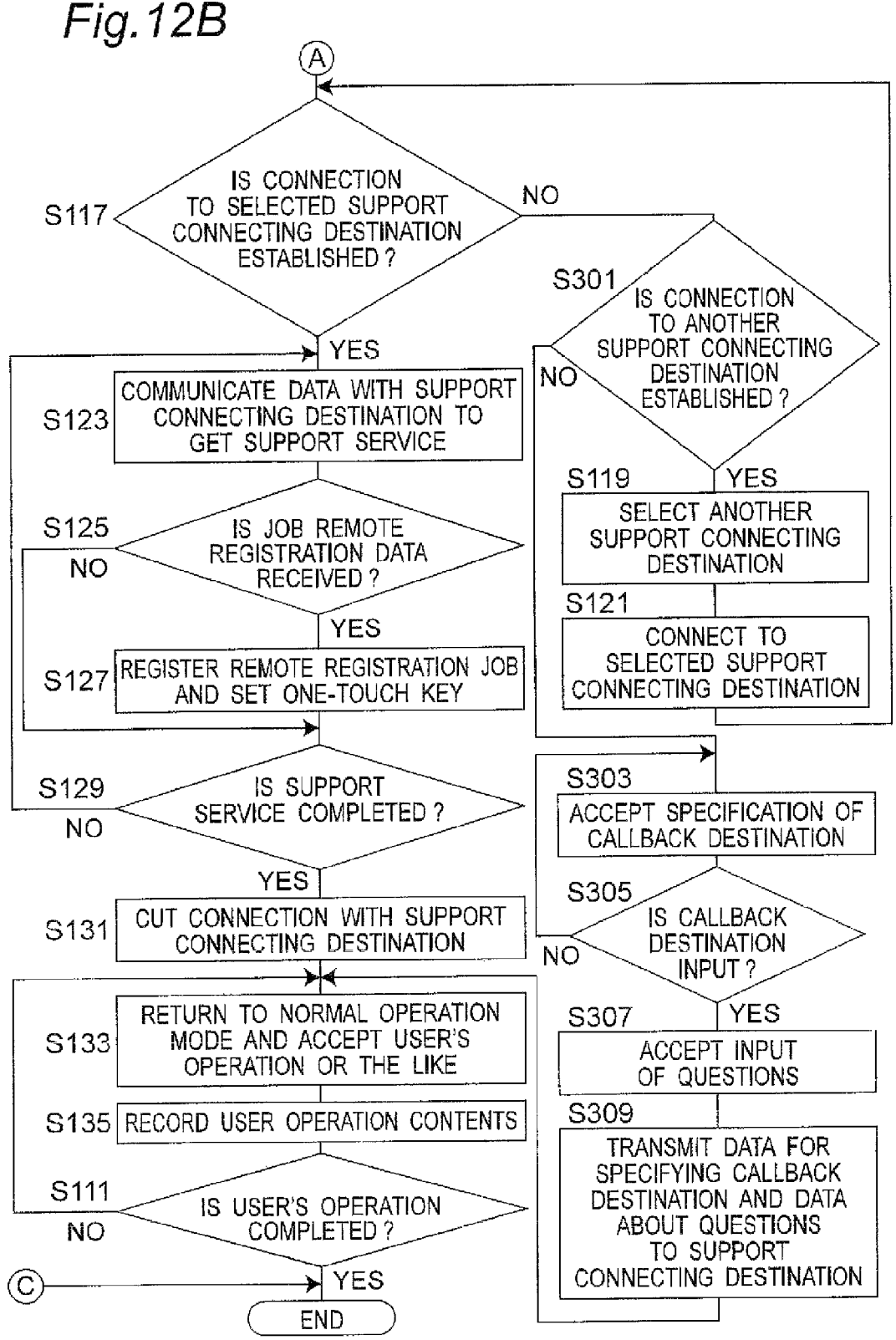
FIG. 12B is a flowchart illustrating a process to be executed by the MFP 1 according to the second embodiment.

The process in the MFP 1 according to the second embodiment is described below with reference to a flowchart. FIGS. 12A and 12B are flowcharts while user's login is accepted, the online support service is provided, and the user completes a predetermined operation. Steps similar to those already described above are denoted by the same reference numerals as those in FIGS. 5A and 5B or 9A and 9B. The steps already described above are suitably simply explained.

The MFP 1 accepts user's login at step S101. The processes at steps S103, S105, S107, S201, S203, S205, S207 and S209 are as already described.

When the MFP 1 recognizes the pressing of the online help key at step S109, it selects a support connecting destination (step S113) so as to try to establish communication with the selected support connecting destination (step S115).

The MFP 1 determines at step S117 whether the connection with the support PC as the support connecting destination is established. When the MFP 1 determines that the connection with the support PC is not established ("NO" at step S117), the process goes to step S301.

At the step S301 the MFP 1 posts the non-establishment of the communication to the user, and request the user to select whether connection to another support connecting destination is tried or callback from the support connecting destination is requested.

When the user selects the connection to another support connecting destination, the MFP 1 executes steps S119 and S121, and returns to step S117.

When the user selects the callback from the support connecting destination selected at this time point, the process goes to step S303.

The MFP 1 requests the user to specify a callback destination at step S303.

FIG. 14 is a diagram illustrating an example of a screen displayed on the display section 3 (input section 5) at this time. The user can specify the current-used MFP 1 as the callback destination. As the callback destination, a personal computer, a cellular phone or a telephone registered in advance can be selected.

The MFP 1 determines at step S305 whether the callback destination is specified.

When the MFP 1 determines that the callback destination is specified ("YES" at step S305), the process goes to step S307.

When the MFP 1 determines that the callback destination is not specified ("NO" at step S305), the process returns to step S303.

At step S307 the user can input questions for the support staff of the support connecting destination.

FIG. 15 is a diagram illustrating an example of a screen to be displayed on the display section 3 (input section 5). The user can select questions from a prepared list of question options. The questions to be displayed here are selected by the MFP 1 from a plurality of questions retained in advance based on user operation contents so as to be displayed. Further, the user can input questions through a voice via the microphone 9. The input sound is exchanged into textual data by the voice recognizing module 39c so as to be capable of being transmitted to the support connecting destination.

At step S309 the MFP 1 transmits the callback destination specification data and the question data to the support connecting destination at step S309.

FIG. 16 is a diagram illustrating an example of the callback destination registration database 31b. The callback destination registration database 31b is a database where callback destinations are registered for respective users. For example, a user whose name is Takahashi registers a PC1, a cellular phone 1 and a telephone 1 as the callback destinations. The PC1 is registered to get the online support using the communication software A. At this time, the MFP 1 relays callback communication in a data format suitable for the communication software A. As the callback destination communication apparatus (device), a plurality of communication apparatuses can be registered. Further, priorities are given to the plurality of communication apparatuses, and when the callback to an upper communication apparatus fails, callback to a lower communication apparatus may be automatically started. The communication apparatus as a callback destination can be registered in such a manner that the user manually input in advance. Further, the MFP 1 records the communication apparatus used for connection to the MFP 1 by the user in the past, and can automatically register them as candidates of the callback destination into the callback destination registration database 31b.

After step S123 after the communication is established at step S117, since the steps up to step S111 are as already described, the description thereof is omitted.

Figure 13:
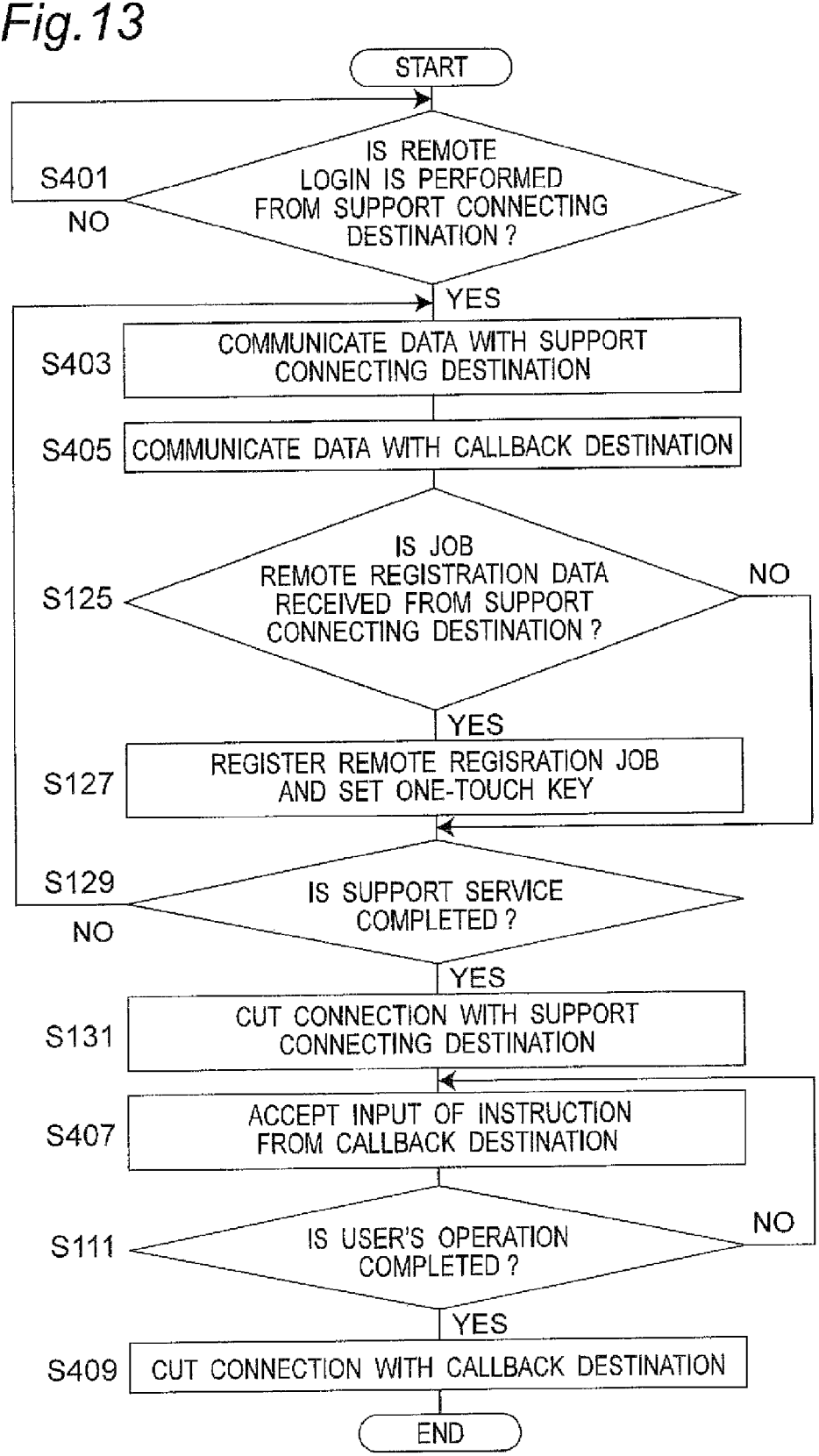
FIG. 13 is a flowchart illustrating a process to be executed by the MFP 1 according to the second embodiment.

A process of the MFP 1 after the MFP 1 receives the callback from the support connecting destination is described below with reference to FIG. 13.

The MFP 1 determines at step S401 presence/non-presence of remote login into the MFP 1 from the support PC as the support connecting destination.

When the MFP 1 determines the remote login from the support connecting destination ("YES" at step S401), the process goes to step S403.

The MFP 1 communicates data with the support connecting destination at step S403, and transmits user operation contents and UI data and the like at the time of pressing down the online help key 61 so as to provide information about the support to the support connecting destination. Further, the MFP 1 activates a remote operable state with respect to the support connecting destination. The support connecting destination sends the callback destination data to the MFP 1.

At step S405, the callback communication relay module 57 of the MFP 1 establishes communication with the communication apparatus specified as the callback destination based on the callback destination data received from the support connecting destination. The MFP 1 establishes the communication between the user who operates the communication apparatus and the support staff who operates the support PC at the support connecting destination.

Thereafter, the user can receive the support service from the support staff in the communication apparatus at the callback destination via the MFP 1. For example, when the communication apparatus at the callback destination is a personal computer, on the communication software the operation screen of the MFP 1 is checked, the MFP 1 is actually operated remotely, and the user can exchange questions and answers with the support staff via voices.

The MFP 1 determines at step S125 whether job remote registration data is received from the support PC. When receiving the job remote registration data, the MFP 1 registers this job at step S127 so as to set a one-touch key corresponding to the job.

When the support service is completed ("YES" at step 129), the MFP 1 disconnects the communication with the support connecting destination (step S131).

The MFP 1 receives remote operation data from the communication apparatus at the callback destination at step S407, and operates based on the data. For example, when the user presses down the one-touch key using the communication software on the personal computer, the MFP 1 starts to execute the registered job related with the one-touch key.

When the original object is attained, the user ends the communication software so as to cancel the remote operation.

When the MFP 1 determines that the user's operation is completed ("YES" at step S111), it disconnects the communication with the communication apparatus at the callback destination at step S409.

In the second embodiment, the state of the MFP 1 can be restored to the state that the online help key 61 is pressed down even at the time of the callback. For this reason, the user can get very understandable online support via the specified communication apparatus. Further, the job that is remotely registered into the MFP 1 by the support staff at the time of the callback can be utilized from the communication apparatus at the callback destination. Further, the user logs into the MFP 1 at a later day so as to be capable of making the MFP 1 execute the remote registration job.

The image processing apparatus according to the present invention has the online help key in the user interface section. When recognizing the pressing of this key, the image processing apparatus immediately establishes the communication with a predetermined online support center.

In the image processing apparatus according to the present invention, therefore, when the user tries to get the support service from the online support center, a disadvantage such that the user does not know contact information is not caused. Further, when the user tries to get support service, the user does not have to input contact information into a communication unit.

The image processing apparatus according to the present invention successively gains operation contents and conditions of the user's image processing apparatuses. When the image processing apparatus recognizes pressing of the online help key, it can select to determine an online support center to communication with based on the operation contents and the conditions at that time.

In the image processing apparatus according to the present invention, therefore, even when the support center divisionally implements the support service according to operation contents and troubles of the image processing apparatus, the user is not at a loss to choose a support center with which the user contacts.

The image processing apparatus according to the present invention can accept the remote operation from the online support center, and can accept the job registration from the online support center. The user can call to execute the job remotely registered by the online support center. When the user presses down the online help key after calling the job, the image processing apparatus establishes communication with the online support center which remotely registers the job. For this reason, the user can execute a desired process in an unaccustomed operation without question.

In the image processing apparatus according to the present invention, therefore, the method for operating the image processing apparatus, a trouble solving method and the like can be described by actually operating the image processing apparatus remotely from the support center. For this reason, the support service, that is more efficient than a case of giving only spoken description to the user, can be implemented.

The image processing apparatus according to the present invention can register plural pieces of desired callback contact information in advance. As the callback destinations, communication apparatuses other than the image processing apparatus can be registered. In this case, the image processing apparatus relays the communication between the communication apparatus and the support center.

In the image processing apparatus according to the present invention, therefore, when the support center cannot respond immediately to a request of a support service from the user and thus is necessary to make callback to the user, the user does not have to input desired callback contact information. Further, at the time of the callback, an operation environment at the time point of user's pressing of the online help key can be easily reproduced. Communication apparatuses other than the image processing apparatus can get the online support service.

The present invention can be carried out as a program executable by a computer. The program according to the present invention is installed into the computer of the image processing apparatus or an information processing apparatus (personal computer or the like) connected to the image processing apparatus so as to be executed. As a result, the present invention can be carried out. This program is recorded in storage medium such as flexible discs and optical discs so as to be capable of being distributed, or being distributed via the communication line via the internet.

Industrial Applicability

The present invention provides the image processing apparatus having an excellent function to support users, and is effective in the field of the image processing apparatus.

Reference Signs List

1: MFP
5: input section
3: display section
7: speaker
9: microphone
30: communication interface
31: database section
31a: support database
31b: callback destination registration database
31c: user information database
39: input/output information control module
41: main control module
43: information determining module
45: user operation information determining module 47: paired remote destination transmission/reception information determining module (paired-tr-info-det module)
49: remote operation information determining module
55: remote access control module
57: callback communication relay module
100: image processing apparatus support system
IPP: internet telephone
MP1: cellular phone
P1: telephone
PC1: user PC
SA: PC for support staff
HS: headset

The invention claimed is:

1. An image processing apparatus, comprising:
a user operation data retaining section for retaining user operation data in which user operation contents are recorded;
an input section having a help key for instructing start of execution of an online support function; and
a support data retaining section for retaining information about a support connecting destination to be connected on a online support,
wherein when pressing of the help key is recognized, at least a part of the contents of the user's operation performed until the pressing is gained by referring to the user operation data, and a support connecting destination according to the gained user operation contents is selected by referring to the support data retaining section, so that connection of communication with the selected support connecting destination is requested.

2. The image processing apparatus according to claim 1, further comprising a transmitting section for transmitting the user operation data that is retained in the user operation data retaining section and represents the contents of the operation performed by the user until the time point of the pressing of the help key to the selected support connecting destination.

3. The image processing apparatus according to claim 1, further comprising:
a display section for displaying information received from the support connecting destination; and
a transmission/reception information determining section for registering a job related with the user based on job remote registration data for remotely registering a job received from the support connecting destination,
wherein the display section displays a button corresponding to the job.

4. The image processing apparatus according to claim 3, wherein when login of the user is accepted, the display section displays the button correspondent with the job related with the user.

5. The image processing apparatus according to claim 4, wherein
when user's pressing of the button is recognized, the job related with the button is called,
when pressing of the help key is recognized with the job being called, connection of communication with the support connecting destination to which the job remote registration data is transmitted is requested.

6. The image processing apparatus according to claim 1, wherein callback destination specification data for specifying at least any one of the image processing apparatus, a personal computer connected to the image processing apparatus and a cellular phone as a callback destination communication apparatus from the support connecting destination is transmitted to the support connecting destination.

7. The image processing apparatus according to claim 6, wherein the communication apparatus used by the user for connecting to the image processing apparatus is maintained as a candidate of the callback destination communication apparatus.

8. The image processing apparatus according to claim 6, wherein the callback destination specification data is transmitted to the support connecting destination, and question data input by the user is transmitted to the support connecting destination.

9. The image processing apparatus according to claim 8, wherein the question data is generated by the image processing apparatus based on voice data input by the user via a microphone provided to the image processing apparatus.

10. The image processing apparatus according to claim 8, wherein the question data is generated by the image processing apparatus based on a question selected from a list of questions displayed on the display section by the user.

11. The image processing apparatus according to claim 10, wherein the question displayed in the list of the questions displayed on the display section is selected to be displayed by referring to the data of the user's operation.

12. The image processing apparatus according to claim 6, further comprising a callback communication relay module for relaying the communication between the support connecting destination and the callback destination communication apparatus.

13. The image processing apparatus according to claim 12, wherein the callback communication relay module relays the callback communication using a data format suitable for communication software to operate on a personal computer as the callback destination communication apparatus.

14. The image processing apparatus according to claim 13, wherein the image processing apparatus receives data input via the communication software and is operated based on the received data.

15. An online support method in an image processing apparatus comprising:
a step of recording user operation data including contents of user's operation into a user operation data retaining section;
a step of displaying an input section having a help key for instructing start of execution of an online support function;
a step of referring to the support data retaining section for retaining information about a support connecting destination to be connected on an online support;
a step of, when pressing of the help key is recognized, gaining at least a part of the contents of the user's operation performed until a time point of the pressing with reference to the user operation data;
a step of selecting a support connecting destination according to the gained user operation contents with reference to the support data retaining section; and
a step of requesting connection of communication with the selected support connecting destination.

* * * * *